US005327553A

United States Patent [19]
Jewett et al.

[11] Patent Number: 5,327,553
[45] Date of Patent: Jul. 5, 1994

[54] FAULT-TOLERANT COMPUTER SYSTEM WITH /CONFIG FILESYSTEM

[75] Inventors: Douglas E. Jewett; Tom Bereiter; Brian Vetter, all of Austin, Tex.

[73] Assignee: Tandem Computers Incorporated, Cupertino, Calif.

[21] Appl. No.: 973,202

[22] Filed: Nov. 6, 1992

Related U.S. Application Data

[63] Continuation of Ser. No. 455,065, Dec. 22, 1989, abandoned.

[51] Int. Cl.⁵ .............................................. G06F 15/16
[52] U.S. Cl. ...................................... 395/575; 371/11.1; 371/11.3
[58] Field of Search .............. 364/200; 395/575, 700; 371/11.3, 11.1, 7, 68.3

[56] References Cited

U.S. PATENT DOCUMENTS

| | | | |
|---|---|---|---|
| 4,234,920 | 11/1980 | Van Ness et al. | 364/200 |
| 4,358,823 | 11/1982 | McDonald et al. | 364/200 |
| 4,392,199 | 7/1983 | Schmitter et al. | 364/200 |
| 4,438,494 | 3/1984 | Budde et al. | 364/200 |
| 4,458,307 | 7/1984 | McAnlis et al. | 364/200 |
| 4,757,505 | 7/1988 | Marrington et al. | 371/66 |
| 4,763,333 | 8/1988 | Byrd | 371/66 |
| 4,823,256 | 4/1989 | Bishop et al. | 364/200 |
| 4,845,419 | 7/1989 | Hacker | 320/39 |
| 4,868,832 | 9/1989 | Marrington et al. | 371/66 |
| 4,907,232 | 3/1990 | Harper et al. | 371/36 |
| 4,959,774 | 9/1990 | Davis | 364/200 |
| 4,965,717 | 10/1990 | Cutts, Jr. et al. | 364/200 |
| 5,001,628 | 3/1991 | Johnson et al. | 364/200 |
| 5,018,148 | 5/1991 | Patel et al. | 371/66 |
| 5,020,059 | 5/1991 | Gorin et al. | 371/11.3 |

OTHER PUBLICATIONS

D. Nadel, "Closely Coupled asynchronous hierarchical and parallel processing in an open architecture," The 12th Annual International Symposium on Computer Architecture, Conference Proceedings, Boston, Mass., Jun. 17-19, 1985 pp. 215-220.

S. Chang, "Multiple-Read Single Write Memory and its Applications", *IEEE Transactions on Computers*, Aug. 1990, pp. 689-694.

*Primary Examiner*—Robert W. Beausoliel, Jr.
*Assistant Examiner*—Ly V. Hua
*Attorney, Agent, or Firm*—Graham & James

[57] ABSTRACT

A fault-tolerant computer system employs a pseudo-filesystem to dynamically manage the hardware components. A directory which appears as a standard, hierarchical directory in this filesystem contains a file for each component; each file maps to either a hardware component or a software module. The pseudo-filesystem hierarchy is determined during system initialization and is automatically updated whenever the software or hardware configuration changes. The pseudo-filesystem, called /config filesystem herein, is implemented as a Unix filesystem in the Unix filesystem switch. This pseudo-filesystem method may be implemented in a fault-tolerant, redundant computer system configuration having multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references are voted at the three separate ports of each of the memory modules.

18 Claims, 11 Drawing Sheets

FAULT-TOLERANT COMPUTER SYSTEM WITH /CONFIG FILESYSTEM

This is a continuation of copending application Ser. No. 07/455,065 filed on Dec. 22, 1989, now abandoned.

RELATED CASES

This application discloses subject matter also disclosed in copending U.S. Patent Applications Ser. Nos. 455,127 and 455,218concurrently filed herewith and subsequently abandoned in favor of CIP application Ser. Nos. 461,402 and 461,250, respectively, Ser. Nos. 282,469, 282,538, 282,540, 282,629, 283,139 and 283,141, filed Dec. 9, 1988, Ser. No. 283,574, filed Dec. 13, 1988, and U.S. Pat. No. 4,965,717, filed Dec. 13, 1988 and issued Oct. 23, 1990, and further discloses subject matter also disclosed in prior copending application Ser. No. 118,503, filed Nov. 9, 1987, all of said applications being assigned to Tandem Computers Incorporated, the assignee of this invention.

BACKGROUND OF THE INVENTION

This invention relates to computer systems, and more particularly to a file system used for configuring for a fault-tolerant multiprocessor system.

Highly reliable digital processing is achieved in various computer architectures employing redundancy. For example, TMR (triple modular redundancy) systems may employ three CPUs executing the same instruction stream, along with three separate main memory units and separate I/O devices which duplicate functions, so if one of each type of element fails, the system continues to operate. Another fault-tolerant type of system is shown in U.S. Pat. No. 4,228,496, issued to Katzman et al, for "Multiprocessor System", assigned to Tandem Computers Incorporated. Various methods have been used for synchronizing the units in redundant systems; for example, in said prior application Ser. No. 118,503, filed Nov. 9, 1987, by R. W. Horst, for "Method and Apparatus for Synchronizing a Plurality of Processors", also assigned to Tandem Computers Incorporated, a method of "loose" synchronizing is disclosed, in contrast to other systems which have employed a lockstep synchronization using a single clock, as shown in U.S. Pat. No. 4,453,215 for "Central Processing Apparatus for Fault-Tolerant Computing", assigned to Stratus Computer, Inc. A technique called "synchronization voting" is disclosed by Davies & Wakerly in "Synchronization and Matching in Redundant Systems", IEEE Transactions on Computers June 1978, pp. 531–539. A method for interrupt synchronization in redundant fault-tolerant systems is disclosed by Yondea et al in Proceeding of 15th Annual Symposium on Fault-Tolerant Computing, June 1985, pp. 246-251, "Implementation of Interrupt Handler for Loosely Synchronized TMR Systems". U.S. Pat. No. 4,644,498 for "Fault-Tolerant Real Time Clock" discloses a triple modular redundant clock configuration for use in a TMR computer system. U.S. Pat. No. 4,733,353 for "Frame Synchronization of Multiply Redundant Computers" discloses a synchronization method using separately-clocked CPUs which are periodically synchronized by executing a synch frame.

The fault-tolerant computer systems of the type shown in these prior patents and publications have used custom-designed operating systems and applications software written especially for each system, rather than using more generalized operating systems so that widely available applications software could be employed. Thus, the variety of applications software has been limited, and that available has been expensive. For this reason, a system as illustrated herein is intended to make use of a standard operating system, Unix TM.

In a fault-tolerant computer system having redundant modules, the system can continue to operate in a wide variety of configurations. CPU modules, memory modules or I/O modules may be removed from the system while the remaining component parts continue to operate. At any given time, however, the operating system must have an accurate record of what the system configuration is, i.e., what modules are present and operating in full capacity. Examining the configuration of a Unix TM system presents difficulties, however. Usually a /dev entry is employed for this purpose, but /dev entries tell what could be installed, not what is installed. Unix system traditionally access hardware components and software modules through a series of special files (the /dev entries). These files must be created by a system administrator and must be explicitly modified whenever the system configuration changes.

It is the principal object of this invention to provide an improved method of operating a high-reliability computer system, particularly of the fault-tolerant type. Another object is to provide improved operation of a redundant, fault-tolerant type of computing system in situations where faulty hardware components may be removed from the system and replaced while the system continues to operate, and one in which reliability, high performance and reduced cost are possible. A further object is to provide a high-reliability computer system in which the performance, measured in reliability as well as speed and software compatibility, is improved but yet at a cost comparable to other alternatives of lower performance. An additional object is to provide a high-reliability computer system which is capable of executing an operating system which uses virtual memory management with demand paging, and having protected (supervisory or "kernel") mode (e.g., a standard Unix operating system), particularly an operating system also permitting execution of multiple processes; all at a high level of performance but yet in a reliable manner.

SUMMARY OF THE INVENTION

In accordance with one embodiment of the invention, a fault-tolerant computer system employs a pseudo-filesystem to dynamically manage the hardware components. A directory which appears as a standard, hierarchical directory in this filesystem contains a file for each component; each file maps to either a hardware component or a software module. The pseudo-filesystem hierarchy is determined during system initialization and is automatically updated whenever the software or hardware configuration changes. The hierarchical method of presentation provides a natural way of illustrating the connection between components. An accurate map of the current state of the system can be viewed using standard tools for listing files. The pseudo-filesystem, called /config filesystem herein, is implemented as a Unix filesystem in the Unix filesystem switch. Internally, /config files are grouped into a set of subsystems (e.g., subdirectories for software, CPUs, memory units, I/O processors, etc.). Each file is represented by an information node (inode) which stores information about the subsystem and component it represents. When a filesystem request to read, write or modify an inode is received the request is passed on to the corresponding subsystem. Return status from the subsystem is returned as status from the filesystem request. When the operating system detects a change in the system configuration (e.g., a failure of a component) the corresponding inodes in the /config filesystem are changed.

This pseudo-filesystem method may be implemented in a fault-tolerant, redundant computer system configuration having multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF SPECIFIC EMBODIMENT

Figure 1:
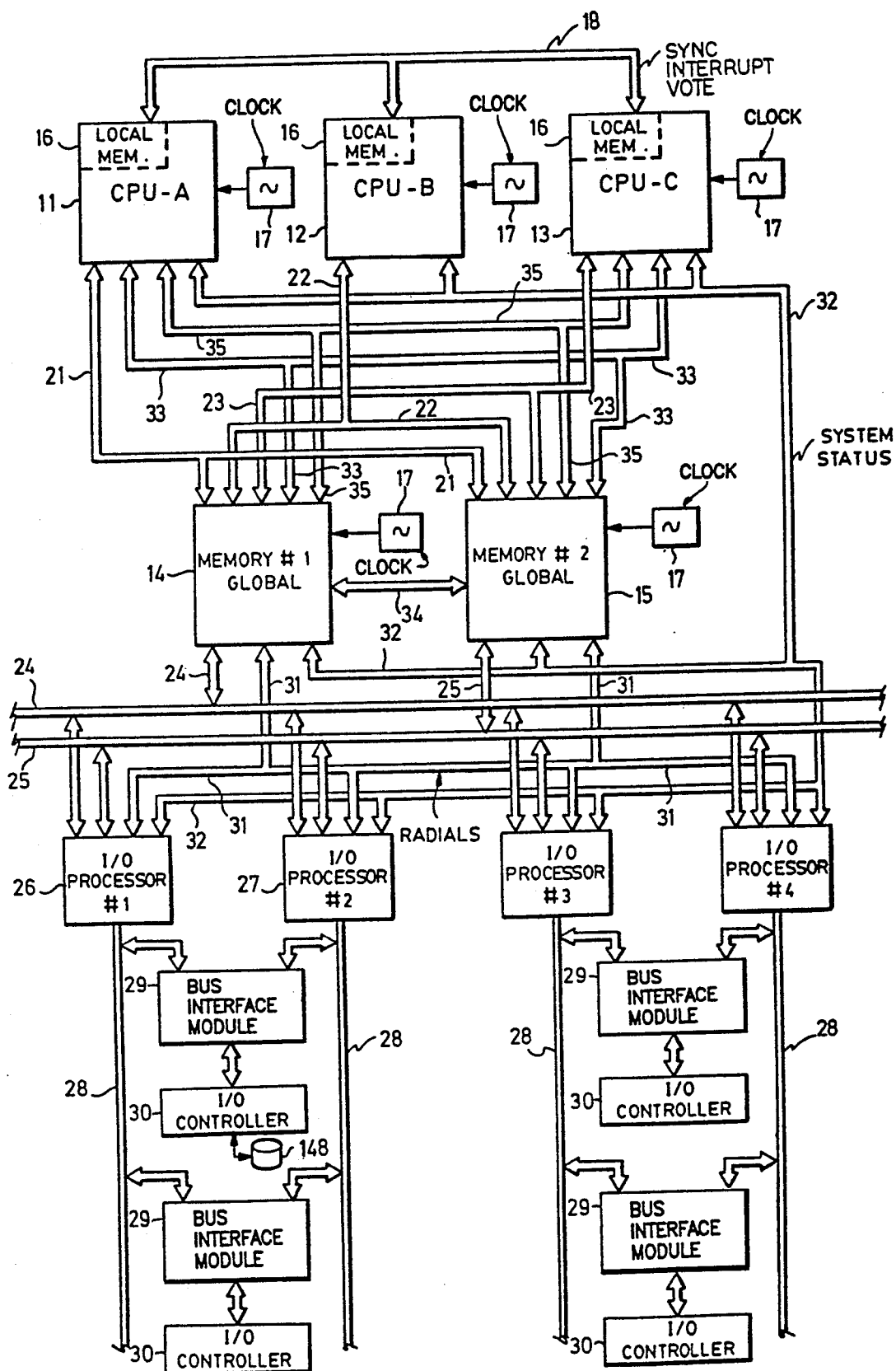
FIG. 1 is an electrical diagram in block form of a computer system according to one embodiment of the invention.

With reference to FIG. 1, a computer system of one type that may employ the file system features of the invention is illustrated. Of course, these features may as well be used in systems of a more general type without the redundancy and the like, but will more likely find utility in fault-tolerant systems where system components may be removed or added while the system is running. The embodiment illustrated has three identical processors 11, 12 and 13, referred to as CPU-A, CPU-B and CPU-C, which operate as one logical processor, all three typically executing the same instruction stream; the only time the three processors are not executing the same instruction stream is in such operations as power-up self test, diagnostics and the like. The three processors are coupled to two memory modules 14 and 15, referred to as Memory-#1 and Memory-#2, each memory storing the same data in the same address space. In a preferred embodiment, each one of the processors 11, 12 and 13 contains its own local memory 16, as well, accessible only by the processor containing this memory.

Each one of the processors 11, 12 and 13, as well as each one of the memory modules 14 and 15, has its own separate clock oscillator 17; in this embodiment, the processors are not run in "lock step", but instead are loosely synchronized by a method such as is set forth in the above-mentioned copending applications, i.e., using events such as external memory references to bring the CPUs into synchronization. External interrupts are synchronized among the three CPUs by a technique employing a set of busses 18 for coupling the interrupt requests and status from each of the processors to the other two; each one of the processors CPU-A, CPU-B and CPU-C is responsive to the three interrupt requests, its own and the two received from the other CPUs, to present an interrupt to the CPUs at the same point in the execution stream. The memory modules 14 and 15 vote the memory references, and allow a memory reference to proceed only when all three CPUs have made the same request (with provision for faults). In this manner, the processors are synchronized at the time of external events (memory references), resulting in the processors typically executing the same instruction stream, in the same sequence, but not necessarily during aligned clock cycles in the time between synchronization events. In addition, external interrupts are synchronized to be executed at the same point in the instruction stream of each CPU.

The CPU-A processor 11 is connected to the Memory-#1 module 14 and to the Memory-#2 module 15 by a bus 21; likewise the CPU-B is connected to the modules 14 and 15 by a bus 22, and the CPU-C is connected to the memory modules by a bus 23. These busses 21, 22, 23 each include a 32-bit multiplexed address/data bus, a command bus, and control lines for address and data strobes. The CPUs have control of these busses 21, 22 and 23, so there is no arbitration, or bus-request and bus-grant.

Each one of the memory modules 14 and 15 is separately coupled to a respective input/output bus 24 or 25, and each of these busses is coupled to two (or more)

input/output processors 26 and 27. The system can have multiple I/O processors as needed to accommodate the I/O devices needed for the particular system configuration. Each one of the input/output processors 26 and 27 is connected to a bus 28, which may be of a standard configuration such as a VMEbus TM, and each bus 28 is connected to one or more bus interface modules 29 for interface with a standard I/O controller 30. Each bus interface module 29 is connected to two of the busses 28, so failure of one I/O processor 26 or 27, or failure of one of the bus channels 28, can be tolerated. The I/O processors 26 and 27 can be addressed by the CPUs 11, 12 and 13 through the memory modules 14 and 15, and can signal an interrupt to the CPUs via the memory modules. Disk drives, terminals with CRT screens and keyboards, and network adapters, are typical peripheral devices operated by the controllers 30. The controllers 30 may make DMA-type references to the memory modules 14 and 15 to transfer blocks of data. Each one of the I/O processors 26, 27, etc., has certain individual lines directly connected to each one of the memory modules for bus request, bus grant, etc.; these point-to-point connections are called "radials" and are included in a group of radial lines 31.

A system status bus 32 is individually connected to each one of the CPUs 11, 12 and 13, to each memory module 14 and 15, and to each of the I/O processors 26 and 27, for the purpose of providing information on the status of each element. This status bus provides information about which of the CPUs, memory modules and I/O processors is currently in the system and operating properly, and this information is maintained in the /config filesystem according to the invention.

An acknowledge/status bus 33 connecting the three CPUs and two memory modules includes individual lines by which the modules 14 and 15 send acknowledge signals to the CPUs when memory requests are made by the CPUs, and at the same time a status field is sent to report on the status of the command and whether it executed correctly. The memory modules not only check parity on data read from or written to the global memory, but also check parity on data passing through the memory modules to or from the I/O busses 24 and 25, as well as checking the validity of commands. It is through the status lines in bus 33 that these checks are reported to the CPUs 11, 12 and 13, so if errors occur a fault routine can be entered to isolate a faulty component.

Even though both memory modules 14 and 15 are storing the same data in global memory, and operating to perform every memory reference in duplicate, one of these memory modules is designated as primary and the other as back-up, at any given time. Memory write operations are executed by both memory modules so both are kept current, and also a memory read operation is executed by both, but only the primary module actually loads the read-data back onto the busses 21, 22 and 23, and only the primary memory module controls the arbitration for multi-master busses 24 and 25. To keep the primary and back-up modules executing the same operations, a bus 34 conveys control information from primary to back-up. Either module can assume the role of primary at boot-up, and the roles can switch during operation under software control; the roles can also switch when selected error conditions are detected by the CPUs or other error-responsive parts of the system.

Certain interrupts generated in the CPUs are also voted by the memory modules 14 and 15. When the CPUs encounter such an interrupt condition (and are not stalled), they signal an interrupt request to the memory modules by individual lines in an interrupt bus 35, so the three interrupt requests from the three CPUs can be voted. When all interrupts have been voted, the memory modules each send a voted-interrupt signal to the three CPUs via bus 35. This voting of interrupts also functions to check on the operation of the CPUs. The three CPUs synch the voted interrupt CPU interrupt signal via the inter-CPU bus 18 and present the interrupt to the processors at a common point in the instruction stream. This interrupt synchronization is accomplished without stalling any of the CPUs.

CPU Module

Figure 2:
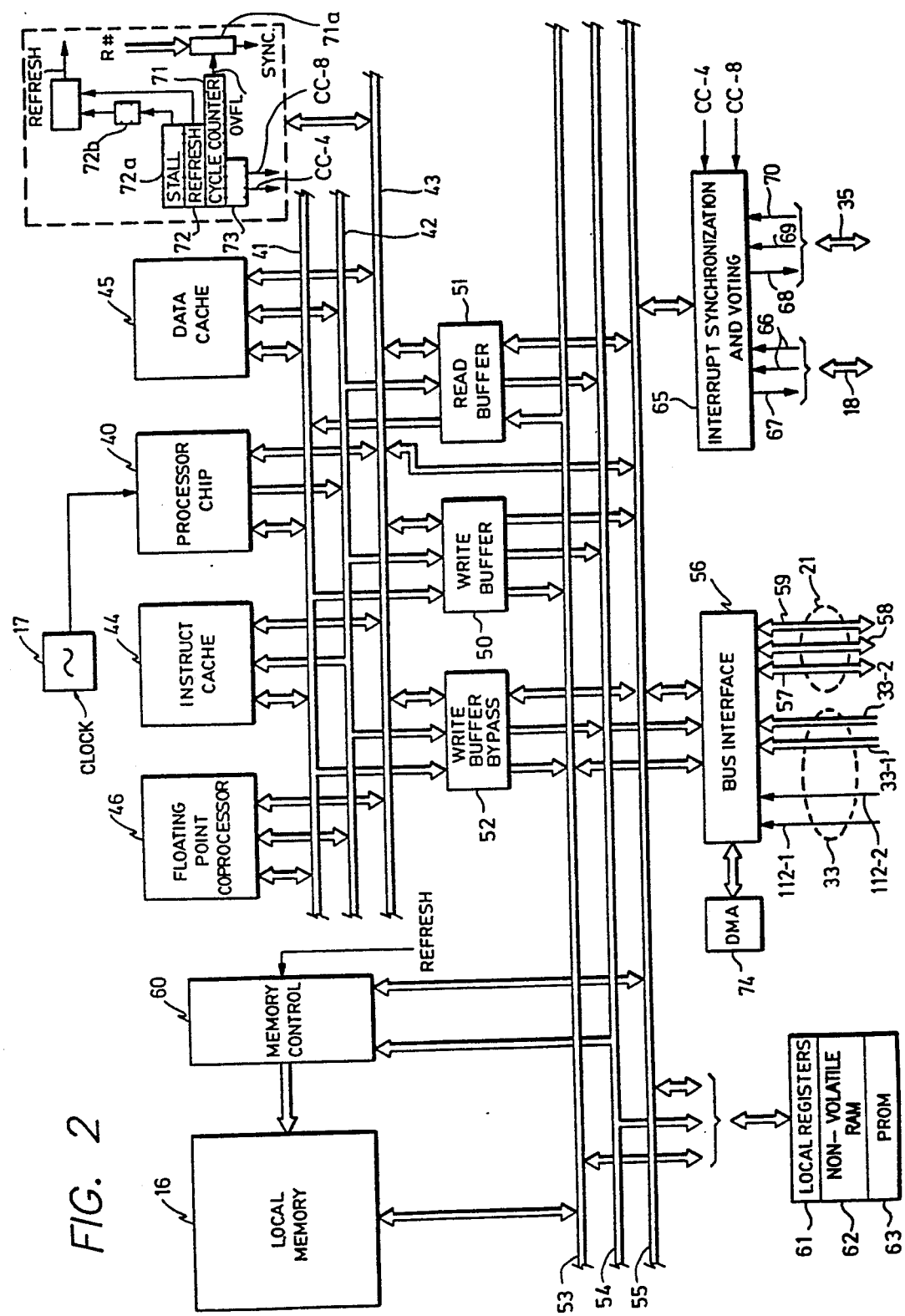
FIG. 2 is an electrical schematic diagram in block form of one of the CPUs of the system of FIG. 1.

Referring now to FIG. 2, one of the processors 11, 12 or 13 is shown in more detail. All three CPU modules are of the same construction in a preferred embodiment, so only CPU-A will be described here. In order to keep costs within a competitive range, and to provide ready access to already-developed software and operating systems, it is preferred to use a commerically-available microprocessor chip, and any one of a number of devices may be chosen. The RISC (reduced instruction set) architecture has some advantage in implementing the loose synchronization as will be described, but more-conventional CISC (complex instruction set) microprocessors such as Motorola 68030 devices or Intel 80386 devices (available in 20-MHz and 25-MHz speeds) could be used. High-speed 32-bit RISC microprocessor devices are available from several sources in three basic types; Motorola produces a device as part number 88000, MIPS Computer Systems, Inc. and others produce a chip set referred to as the MIPS type, and Sun Microsystems has announced a so-called SPARC TM type (scalable processor architecture). Cypress Semiconductor of San Jose, Calif., for example, manufactures a microprocessor referred to as part number CY7C601 providing 20-MIPS (million instructions per second), clocked at 33-MHz, supporting the SPARC standard, and Fujitsu manufactures a CMOS RISC microprocessor, part number S-25, also supporting the SPARC standard.

The CPU board or module in the illustrative embodiment, used as an example, employs a microprocessor chip 40 which is in this case an R2000 device designed by MIPS Computer Systems, Inc., and also manufactured by Integrated Device Technology, Inc. The R2000 device is a 32-bit processor using RISC architecture to provide high performance, e.g., 12-MIPS at 16.67-MHz clock rate. Higher-speed versions of this device may be used instead, such as the R3000 that provides 20-MIPS at 25-MHz clock rate. The processor 40 also has a co-processor used for memory management, including a translation lookaside buffer to cache translations of logical to physical addresses. The processor 40 is coupled to a local bus having a data bus 41, an address bus 42 and a control bus 43. Separate instruction and data cache memories 44 and 45 are coupled to this local bus. These caches are each of 64 K-byte size, for example, and are accessed within a single clock cycle of the processor 40. A numeric or floating point co-processor 46 is coupled to the local bus if additional performance is needed for these types of calculations; this numeric processor device is also commercially available from MIPS Computer Systems as part number R2010. The local bus 41, 42, 43, is coupled to an internal bus structure through a write buffer 50 and a read buffer 51.

The write buffer is a commercially available device, part number R2020, and functions to allow the processor 40 to continue to execute Run cycles after storing data and address in the write buffer 50 for a write operation, rather than having to execute stall cycles while the write is completing.

In addition to the path through the write buffer 50, a path is provided to allow the processor 40 to execute write operations bypassing the write buffer 50. This path is a write buffer bypass 52 allows the processor, under software selection, to perform synchronous writes. If the write buffer bypass 52 is enabled (write buffer 50 not enabled) and the processor executes a write then the processor will stall until the write completes. In contrast, when writes are executed with the write buffer bypass 52 disabled the processor will not stall because data is written into the write buffer 50 (unless the write buffer is full). If the write buffer 50 is enabled when the processor 40 performs a write operation, the write buffer 50 captures the output data from bus 41 and the address from bus 42, as well as controls from bus 43. The write buffer 50 can hold up to four such data-address sets while it waits to pass the data on to the main memory. The write buffer runs synchronously with the clock 17 of the processor chip 40, so the processor-to-buffer transfers are synchronous and at the machine cycle rate of the processor. The write buffer 50 signals the processor if it is full and unable to accept data. Read operations by the processor 40 are checked against the addresses contained in the four-deep write buffer 50, so if a read is attempted to one of the data words waiting in the write buffer to be written to memory 16 or to global memory, the read is stalled until the write is completed.

The write and read buffers 50 and 51 are coupled to an internal bus structure having a data bus 53, an address bus 54 and a control bus 55. The local memory 16 is accessed by this internal bus, and a bus interface 56 coupled to the internal bus is used to access the system bus 21 (or bus 22 or 23 for the other CPUs). The separate data and address busses 53 and 54 of the internal bus (as derived from busses 41 and 42 of the local bus) are converted to a multiplexed address/data bus 57 in the system bus 21, and the command and control lines are correspondingly converted to command lines 58 and control lines 59 in this external bus.

The bus interface unit 56 also receives the acknowledge/status lines 33 from the memory modules 14 and 15. In these lines 33, separate status lines 33-1 or 33-2 are coupled from each of the modules 14 and 15, so the responses from both memory modules can be evaluated upon the event of a transfer (read or write) between CPUs and global memory, as will be explained.

The local memory 16, in one embodiment, comprises about 8-Mbyte of RAM which can be accessed in about three or four of the machine cycles of processor 40, and this access is synchronous with the clock 17 of this CPU, whereas the memory access time to the modules 14 and 15 is much greater than that to local memory, and this access to the memory modules 14 and 15 is asynchronous and subject to the synchronization overhead imposed by waiting for all CPUs to make the request then voting. For comparison, access to a typical commercially-available disk memory through the I/O processors 26, 27 and 29 is measured in milliseconds, i.e., considerably slower than access to the modules 14 and 15. Thus, there is a hierarchy of memory access by the CPU chip 40, the highest being the instruction and data caches 44 and 45 which will provide a hit ratio of perhaps 95% when using 64-KByte cache size and suitable fill algorithms. The second highest is the local memory 16, and again by employing contemporary virtual memory management algorithms a hit ratio of perhaps 95% is obtained for memory references for which a cache miss occurs but a hit in local memory 16 is found, in an example where the size of the local memory is about 8-MByte. The net result, from the standpoint of the processor chip 40, is that perhaps greater than 99% of memory references (but not I/O references) will be synchronous and will occur in either the same machine cycle or in three or four machine cycles.

The local memory 16 is accessed from the internal bus by a memory controller 60 which receives the addresses from address bus 54, and the address strobes from the control bus 55, and generates separate row and column addresses, and RAS and CAS controls, for example, if the local memory 16 employs DRAMs with multiplexed addressing, as is usually the case. Data is written to or read from the local memory via data bus 53. In addition, several local registers 61, as well as non-volatile memory 62 such as NVRAMs, and high-speed PROMs 63, as may be used by the operating system, are accessed by the internal bus; some of this part of the memory is used only at power-on, some is used by the operating system and may be almost continuously within the cache 44, and other may be within the non-cached part of the memory map.

External interrupts are applied to the processor 40 by one of the pins of the control bus 43 or 55 from an interrupt circuit 65 in the CPU module of FIG. 2. This type of interrupt is voted in the circuit 65, so that before an interrupt is executed by the processor 40 it is determined whether or not all three CPUs are presented with the interrupt; to this end, the circuit 65 receives interrupt pending inputs 66 from the other two CPUs 12 and 13, and sends an interrupt pending signal to the other two CPUs via line 67, these lines being part of the bus 18 connecting the three CPUs 11, 12 and 13 together. Also, for voting other types of interrupts, specifically CPU-generated interrupts, the circuit 65 can send an interrupt request from this CPU to both of the memory modules 14 and 15 by a line 68 in the bus 35, then receive separate voted-interrupt signals from the memory modules via lines 69 and 70; both memory modules will present the external interrupt to be acted upon. An interrupt generated in some external source such as a keyboard or disk drive on one of the I/O channels 28, for example, will not be presented to the interrupt pin of the chip 40 from the circuit 65 until each one of the CPUs 11, 12 and 13 is at the same point in the instruction stream, as will be explained.

Since the processors 40 are clocked by separate clock oscillators 17, there must be some mechanism for periodically bringing the processors 40 back into synchronization. Even though the clock oscillators 17 are of the same nominal frequency, e.g., 16.67-MHz, and the tolerance for these devices is about 25-ppm (parts per million), the processors can potentially become many cycles out of phase unless periodically brought back into synch. Of course, every time an external interrupt occurs the CPUs will be brought into synch in the sense of being interrupted at the same point in their instruction stream (due to the interrupt synch mechanism), but this does not help bring the cycle count into synch. The mechanism of voting memory references in the memory modules 14 and 15 will bring the CPUs into synch (in real time), as will be explained. However, some conditions result in long periods where no memory reference occurs, and so an additional mechanism is used to introduce stall cycles to bring the processors 40 back into synch. A cycle counter 71 is coupled to the clock 17 and the control pins of the processor 40 via control bus 43 to count machine cycles which are Run cycles (but not Stall cycles). This counter 71 includes a count register having a maximum count value selected to represent the period during which the maximum allowable drift between CPUs would occur (taking into account the specified tolerance for the crystal oscillators); when this count register overflows action is initiated to stall the faster processors until the slower processor or processors catch up. This counter 71 is reset whenever a synchronization is done by a memory reference to the memory modules 14 and 15. Also, a refresh counter 72 is employed to perform refresh cycles on the local memory 16, as will be explained. In addition, a counter 73 counts machine cycle which are Run cycles but not Stall cycles, like the counter 71 does, but this counter 73 is not reset by a memory reference; the counter 73 is used for interrupt synchronization as explained below, and to this end produces the output signals CC-4 and CC-8 to the interrupt synchronization circuit 65.

The processor 40 has a RISC instruction set which does not support memory-to-memory instructions, but instead only memory-to-register or register-to-memory instructions (i.e., load or store). It is important to keep frequently-used data and the currently-executing code in local memory. Accordingly, a block-transfer operation is provided by a DMA state machine 74 coupled to the bus interface 56. The processor 40 writes a word to a register in the DMA circuit 74 to function as a command, and writes the starting address and length of the block to registers in this circuit 74. In one embodiment, the microprocessor stalls while the DMA circuit takes over and executes the block transfer, producing the necessary addresses, commands and strobes on the busses 53-55 and 21. The command executed by the processor 40 to initiate this block transfer can be a read from a register in the DMA circuit 74. Since memory management in the Unix operating system relies upon demand paging, these block transfers will most often be pages being moved between global and local memory and I/O traffic. A page is 4-KBytes. Of course, the busses 21, 22 and 23 support single-word read and write transfers between CPUs and global memory; the block transfers referred to are only possible between local and global memory.

THE PROCESSOR

Figure 3:
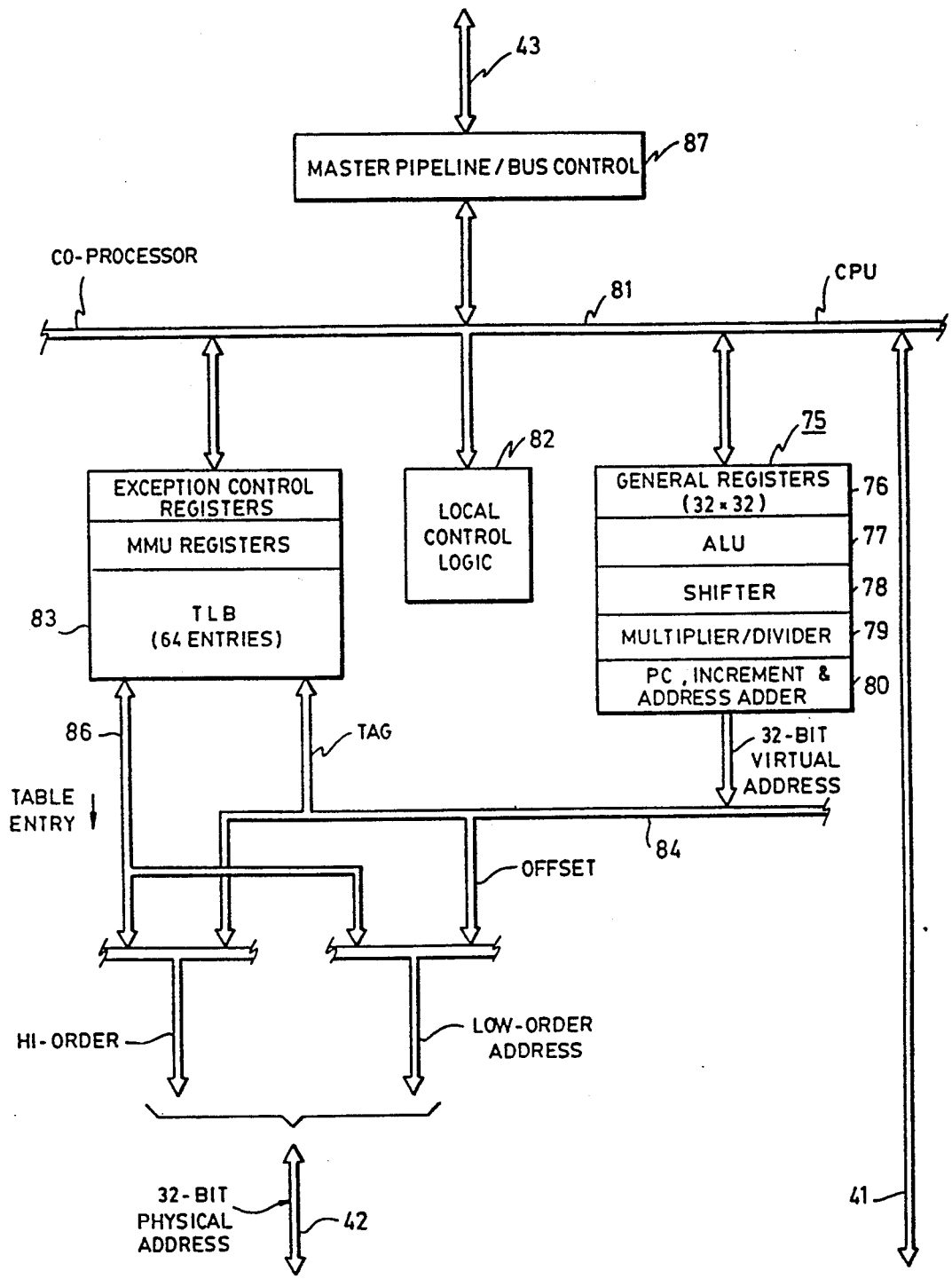
FIG. 3 is an electrical schematic diagram in block form of one of the microprocessor chip used in the CPU of FIG. 2.

Referring now to FIG. 3, the R2000 or R3000 type of microprocessor 40 of the example embodiment is shown in more detail. This device includes a main 32-bit CPU 75 containing thirty-two 32-bit general purpose registers 76, a 32-bit ALU 77, a zero-to-64 bit shifter 78, and a 32-by-32 multiply/divide circuit 79. This CPU also has a program counter 80 along with associated incrementer and adder. These components are coupled to a processor bus structure 81, which is coupled to the local data bus 41 and to an instruction decoder 82 with associated control logic to execute instructions fetched via data bus 41. The 32-bit local address bus 42 is driven by a virtual memory management arrangement including a translation lookaside buffer (TLB) 83 within an on-chip memory-management coprocessor. The TLB 83 contains sixty-four entries to be compared with a virtual address received from the microprocessor block 75 via virtual address bus 84. The low-order 16-bit part 85 of the bus 42 is driven by the low-order part of this virtual address bus 84, and the high-order part is from the bus 84 if the virtual address is used as the physical address, or is the tag entry from the TLB 83 via output 86 if virtual addressing is used and a hit occurs. The control lines 43 of the local bus are connected to pipeline and bus control circuitry 87, driven from the internal bus structure 81 and the control logic 82.

The microprocessor block 75 in the processor 40 is of the RISC type in that most instructions execute in one machine cycle, and the instruction set uses register-to-register and load/store instructions rather than having complex instructions involving memory references along with ALU operations. The main CPU 75 is highly pipelined to facilitate the goal of averaging one instruction execution per machine cycle. A single instruction is executed over a period including five machine cycles, where a machine cycle is one clock period or 60-nsec for a 16.67-MHz clock 17. Construction and operation of the R2000 processor is disclosed in Kane, "MIPS R2000 RISC Architecture", Printice Hall, 1987.

MEMORY MODULE

Figure 4:
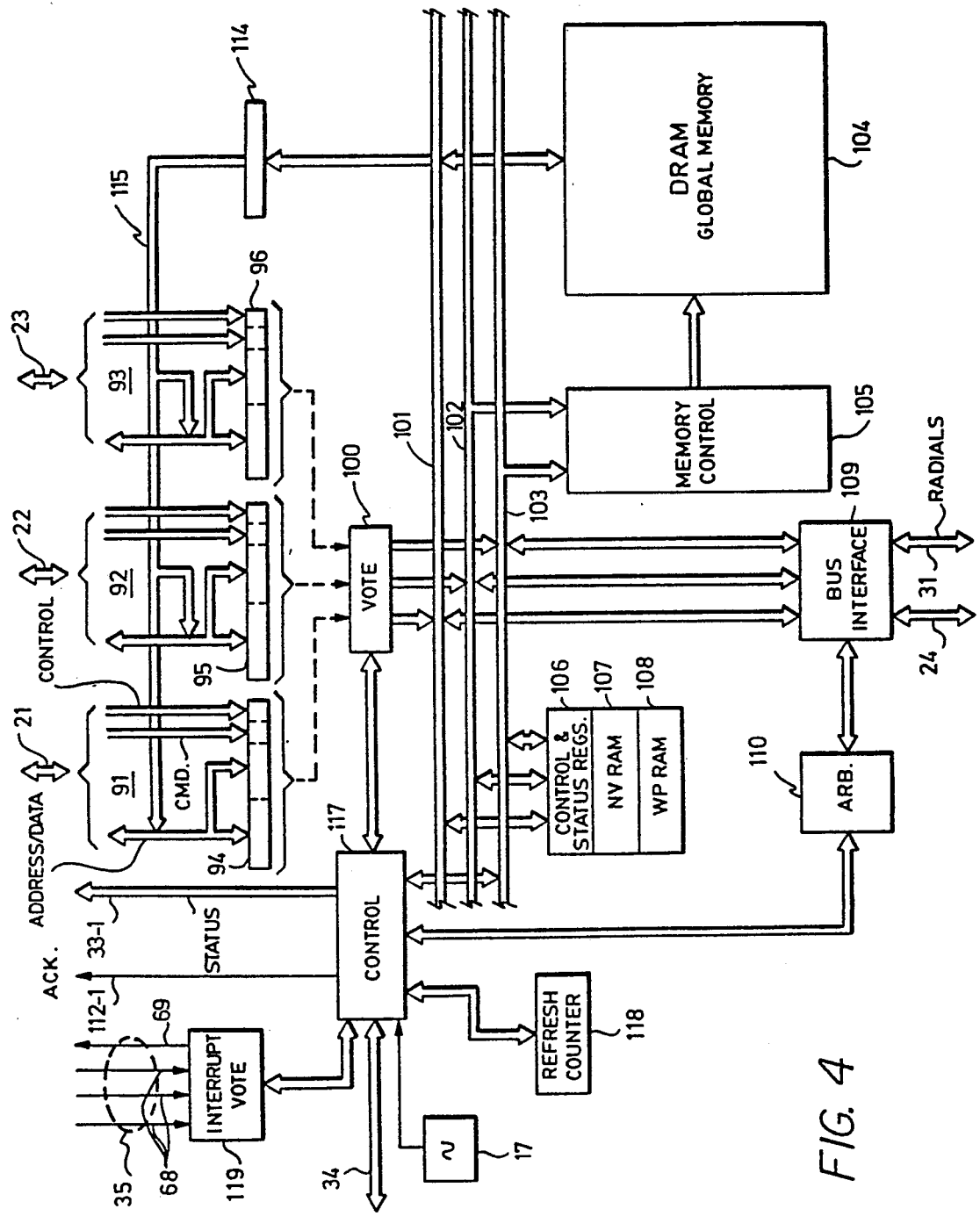
FIG. 4 is an electrical schematic diagram in block form of one of the memory modules in the computer system of FIG. 1.

With reference to FIG. 4, one of the memory modules 14 or 15 is shown in detail. Both memory modules are of the same construction in a preferred embodiment, so only the Memory #1 module is shown. The memory module includes three input/output ports 91, 92 and 93 coupled to the three busses 21, 22 and 23 coming from the CPUs 11, 12 and 13, respectively. Inputs to these ports are latched into registers 94, 95 and 96 each of which has separate sections to store data, address, command and strobes for a write operation, or address, command and strobes for a read operation. The contents of these three registers are voted by a vote circuit 100 having inputs connected to all sections of all three registers. If all three of the CPUs 11, 12 and 13 make the same memory request (same address, same command), as should be the case since the CPUs are typically executing the same instruction stream, then the memory request is allowed to complete; however, as soon as the first memory request is latched into any one of the three latches 94, 95 or 96, it is passed on immediately to begin the memory access. To this end, the address, data and command are applied to an internal bus including data bus 101, address bus 102 and control bus 103. From this internal bus the memory request accesses various resources, depending upon the address, and depending upon the system configuration.

In one embodiment, a large DRAM 104 is accessed by the internal bus, using a memory controller 105 which accepts the address from address bus 102 and memory request and strobes from control bus 103 to generate multiplexed row and column addresses for the DRAM so that data input/output is provided on the data bus 101. This DRAM 104 is also referred to as global memory, and is of a size of perhaps 32-MByte in one embodiment. In addition, the internal bus 101-103 can access control and status registers 106, a quantity of non-volatile RAM 107, and write-protect RAM 108. The memory reference by the CPUs can also bypass the memory in the memory module 14 or 15 and access the I/O busses 24 and 25 by a bus interface 109 which has inputs connected to the internal bus 101-103. If the memory module is the primary memory module, a bus arbitrator 110 in each memory module controls the bus interface 109. If a memory module is the backup module, the bus 34 controls the bus interface 109.

A memory access to the DRAM 104 is initiated as soon as the first request is latched into one of the latches 94, 95 or 96, but is not allowed to complete unless the vote circuit 100 determines that a plurality of the requests are the same, with provision for faults. The arrival of the first of the three requests causes the access to the DRAM 104 to begin. For a read, the DRAM 104 is addressed, the sense amplifiers are strobed, and the data output is produced at the DRAM outputs, so if the vote is good after the third request is received then the requested data is ready for immediate transfer back to the CPUs. In this manner, voting is overlapped with DRAM access.

Figure 5:
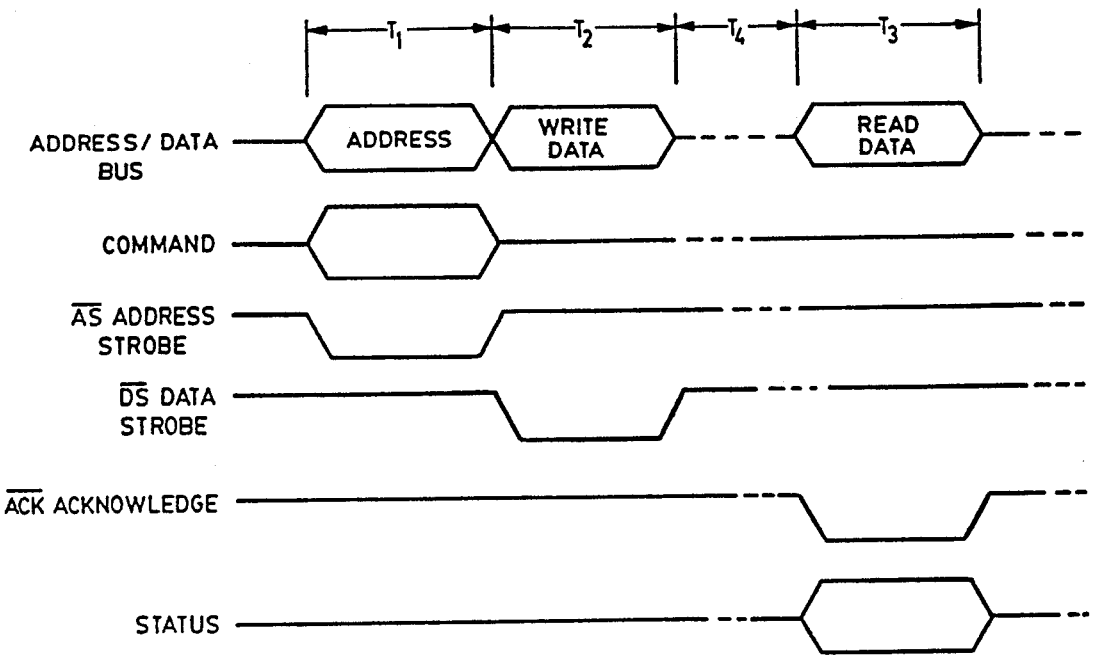
FIG. 5 is a timing diagram showing events occurring on the CPU to memory busses in the system of FIG. 1.

Referring to FIG. 5, the busses 21, 22 and 23 apply memory requests to ports 91, 92 and 93 of the memory modules 14 and 15 in the format illustrated. Each of these busses consists of thirty-two bidirectional multiplexed address/data lines, thirteen unidirectional command lines, and two strobes. The command lines include a field which specifies the type of bus activity, such as read, write, block transfer, single transfer, I/O read or write, etc. Also, a field functions as a byte enable for the four bytes. The strobes are AS, address strobe, and DS, data strobe. The CPUs 11, 12 and 13 each control their own bus 21, 22 or 23; in this embodiment, these are not multi-master busses, there is no contention or arbitration. For a write, the CPU drives the address and command onto the bus in one cycle along with the address strobe AS (active low), then in a subsequent cycle (possibly the next cycle, but not necessarily) drives the data onto the address/data lines of the bus at the same time as a data strobe DS. The address strobe AS from each CPU causes the address and command then appearing at the ports 91, 92 or 93 to be latched into the address and command sections of the registers 94, 95 and 96, as these strobes appear, then the data strobe DS causes the data to be latched. When a plurality (two out of three in this embodiment) of the busses 21, 22 and 23 drive the same memory request into the latches 94, 95 and 96, the vote circuit 100 passes on the final command to the bus 103 and the memory access will be executed; if the command is a write, an acknowledge ACK signal is sent back to each CPU by a line 112 (specifically line 112-1 for Memory#1 and line 112-2 for Memory#2) as soon as the write has been executed, and at the same time status bits are driven via acknowledge/status bus 33 (specifically lines 33-1 for Memory#1 and lines 33-2 for Memory#2) to each CPU at time T3 of FIG. 5. The delay T4 between the last strobe DS (or AS if a read) and the ACK at T3 is variable, depending upon how many cycles out of synch the CPUs are at the time of the memory request, and depending upon the delay in the voting circuit and the phase of the internal independent clock 17 of the memory module 14 or 15 compared to the CPU clocks 17. If the memory request issued by the CPUs is a read, then the ACK signal on lines 112-1 and 112-2 and the status bits on lines 33-1 and 33-2 will be sent at the same time as the data is driven to the address/data bus, during time T3; this will release the stall in the CPUs and thus synchronize the CPU chips 40 on the same instruction. That is, the fastest CPU will have executed more stall cycles as it waited for the slower ones to catch up, then all three will be released at the same time, although the clocks 17 will probably be out of phase; the first instruction executed by all three CPUs when they come out of stall will be the same instruction.

All data being sent from the memory module 14 or 15 to the CPUs 11, 12 and 13, whether the data is read data from the DRAM 104 or from the memory locations 106–108, or is I/O data from the busses 24 and 25, goes through a register 114. This register is loaded from the internal data bus 101, and an output 115 from this register is applied to the address/data lines for busses 21, 22 and 23 at ports 91, 92 and 93 at time T3. Parity is checked when the data is loaded to this register 114. All data written to the DRAM 104, and all data on the I/O busses, has parity bits associated with it, but the parity bits are not transferred on busses 21, 22 and 23 to the CPU modules. Parity errors detected at the read register 114 are reported to the CPU via the status busses 33-1 and 33-2. Only the memory module 14 or 15 designated as primary will drive the data in its register 114 onto the busses 21, 22 and 23. The memory module designated as back-up or secondary will complete a read operation all the way up to the point of loading the register 114 and checking parity, and will report status on buses 33-1 and 33-2, but no data will be driven to the busses 21, 22 and 23.

A controller 117 in each memory module 14 or 15 operates as a state machine clocked by the clock oscillator 17 for this module and receiving the various command lines from bus 103 and busses 21-23, etc., to generate control bits to load registers and busses, generate external control signals, and the like. This controller also is connected to the bus 34 between the memory modules 14 and 15 which transfers status and control information between the two. The controller 117 in the module 14 or 15 currently designated as primary will arbitrate via arbitrator 110 between the I/O side (interface 109) and the CPU side (ports 91-93) for access to the common bus 101-103. This decision made by the controller 117 in the primary memory module 14 or 15 is communicated to the controller 117 of other memory module by the lines 34, and forces the other memory module to execute the same access.

The controller 117 in each memory module also introduces refresh cycles for the DRAM 104, based upon a refresh counter 118 receiving pulses from the clock oscillator 17 for this module. The DRAM must receive 512 refresh cycles every 8-msec, so on average there must be a refresh cycle introduced about every 15-microsec. The counter 118 thus produces an overflow signal to the controller 117 every 15-microsec., and if an idle condition exists (no CPU access or I/O access executing) a refresh cycle is implemented by a command applied to the bus 103. If an operation is in progress, the refresh is executed when the current operation is finished. For lengthy operations such as block transfers used in memory paging, several refresh cycles may be backed up and execute in a burst mode after the transfer is completed; to this end, the number of overflows of counter 118 since the last refresh cycle are accumulated in a register associated with the counter 118.

Interrupt requests for CPU-generated interrupts are received from each CPU 11, 12 and 13 individually by lines 68 in the interrupt bus 35; these interrupt requests are sent to each memory module 14 and 15. These interrupt request lines 68 in bus 35 are applied to an interrupt vote circuit 119 which compares the three requests and produces a voted interrupt signal on outgoing line 69 of the bus 35. The CPUs each receive a voted interrupt signal on the two lines 69 and 70 (one from each module 14 and 15) via the bus 35. The voted interrupts from each memory module 14 and 15 are ORed and presented to the interrupt synchronizing circuit 65. The CPUs, under software control, decide which interrupts to service. External interrupts, generated in the I/O processors or I/O controllers, are also signalled to the CPUs through the memory modules 14 and 15 via lines 69 and 70 in bus 35, and likewise the CPUs only respond to an interrupt from the primary module 14 or 15.

I/O PROCESSOR

Figure 6:
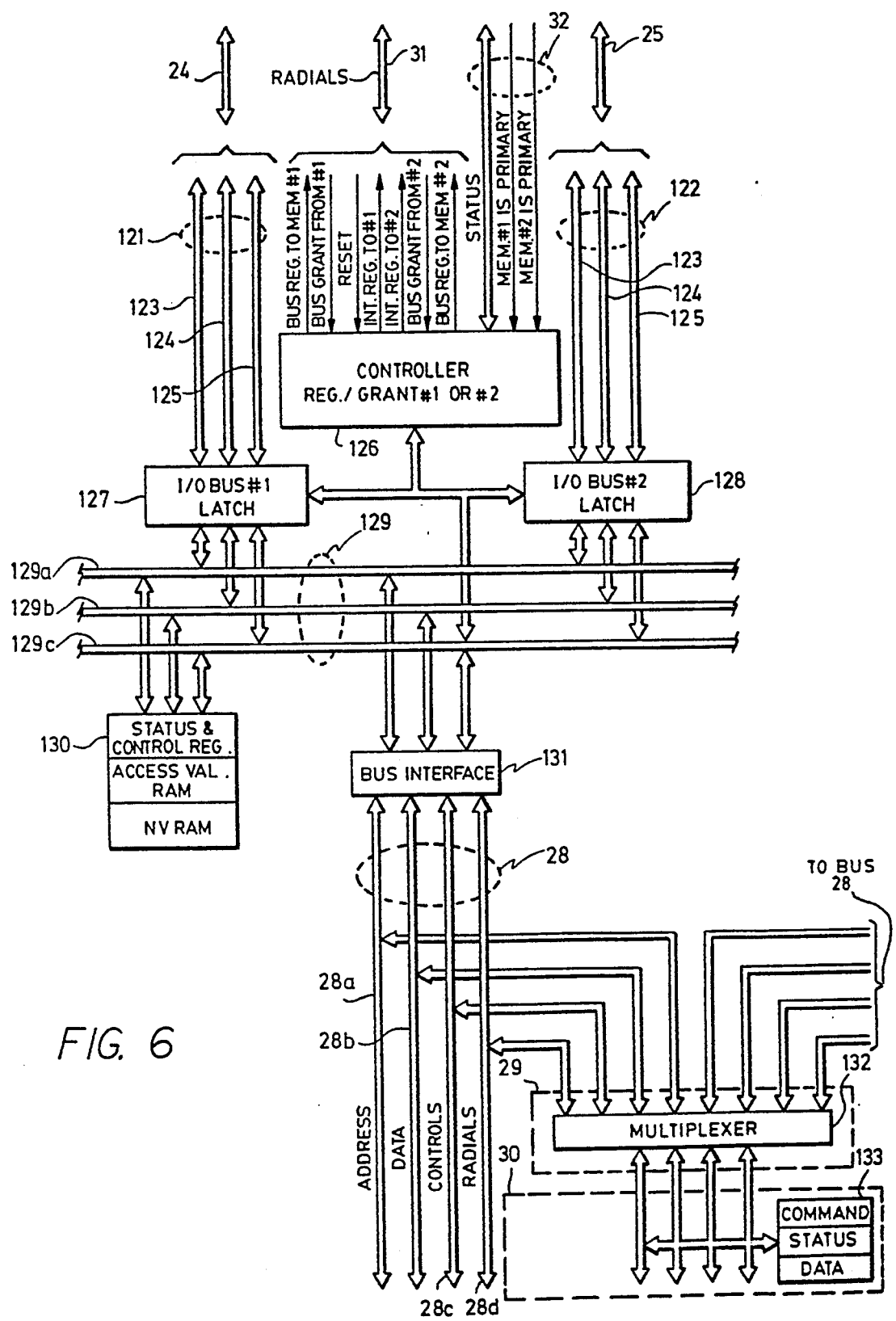
FIG. 6 is an electrical schematic diagram in block form of one of the I/O processors in the computer system of FIG. 1.

Referring now to FIG. 6, one of the I/O processors 26 or 27 is shown in detail. The I/O processor has two identical ports, one port 121 to the I/O bus 24 and the other port 122 to the I/O bus 25. Each one of the I/O busses 24 and 25 consists of: a 36-bit bidirectional multiplexed address/data bus 123 (containing 32-bits plus 4-bits parity), a bidirectional command bus 124 defining the read, write, block read, block write, etc., type of operation that is being executed, an address line that designates which location is being addressed, either internal to I/O processor or on busses 28, and the byte mask, and finally control lines 125 including address strobe, data strobe, address acknowledge and data acknowledge. The radial lines in bus 31 include individual lines from each I/O processor to each memory module: bus request from I/O processor to the memory modules, bus grant from the memory modules to the I/O processor, interrupt request lines from I/O processor to memory module, and a reset line from memory to I/O processor. Lines to indicate which memory module is primary are connected to each I/O processor via the system status bus 32. A controller or state machine 126 in the I/O processor of FIG. 6 receives the command, control, status and radial lines and internal data, and command lines from the busses 28, and defines the internal operation of the I/O processor, including operation of latches 127 and 128 which receive the contents of busses 24 and 25 and also hold information for transmitting onto the busses.

Figure 7:
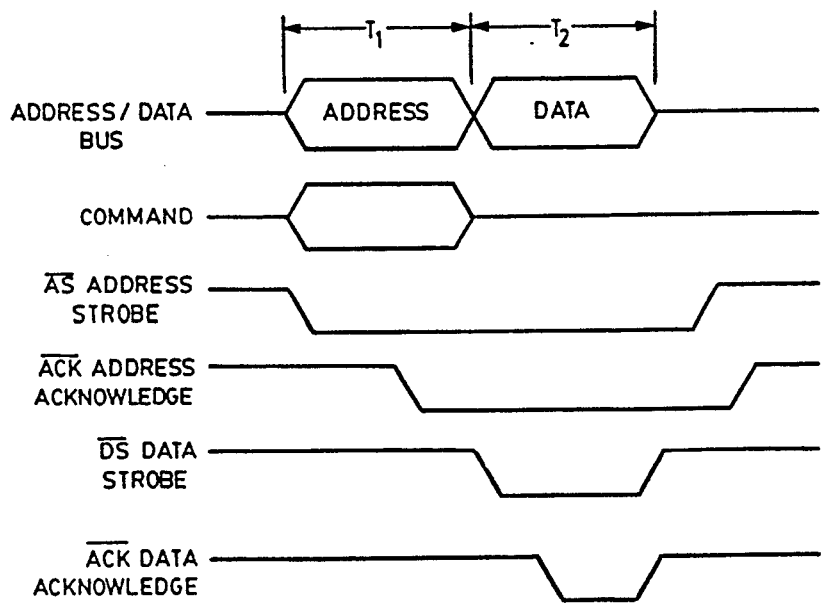
FIG. 7 is a timing diagram showing events vs. time for the transfer protocol between a memory module and an I/O processor in the system of FIG. 1.

Transfer on the busses 24 and 25 from memory module to I/O processor uses a protocol as shown in FIG. 7 with the address and data separately acknowledged. The arbitrator circuit 110 in the memory module which is designated primary performs the arbitration for ownership of the I/O busses 24 and 25. When a transfer from CPUs to I/O is needed, the CPU request is presented to the arbitration logic 110 in the memory module. When the arbiter 110 grants this request the memory modules apply the address and command to busses 123 and 124 (of both busses 24 and 25) at the same time the address strobe is asserted on bus 125 (of both busses 24 and 25) in time T1 of FIG. 7; when the controller 126 has caused the address to be latched into latches 127 or 128, the address acknowledge is asserted on bus 125, then the memory modules place the data (via both busses 24 and 25) on the bus 123 and a data strobe on lines 125 in time T2, following which the controller causes the data to be latched into both latches 127 and 128 and a data acknowledge signal is placed upon the lines 125, so upon receipt of the data acknowledge, both of the memory modules release the bus 24, 25 by de-asserting the address strobe signal. The I/O processor then deasserts the address acknowledge signal.

For transfers from I/O processor to the memory module, when the I/O processor needs to use the I/O bus, it asserts a bus request by a line in the radial bus 31, to both busses 24 and 25, then waits for a bus grant signal from an arbitrator circuit 110 in the primary memory module 14 or 15, the bus grant line also being one of the radials. When the bus grant has been asserted, the controller 126 then waits until the address strobe and address acknowledge signals on busses 125 are deasserted (i.e., false) meaning the previous transfer is completed. At that time, the controller 126 causes the address to be applied from latches 127 and 128 to lines 123 of both busses 24 and 25, the command to be applied to lines 124, and the address strobe to be applied to the bus 125 of both busses 24 and 25. When address acknowledge is received from both busses 24 and 25, these are followed by applying the data to the address/data busses, along with data strobes, and the transfer is completed with a data acknowledge signals from the memory modules to the I/O processor.

The latches 127 and 128 are coupled to an internal bus 129 including an address bus 129a, and data bus 129b and a control bus 129c, which can address internal status and control registers 130 used to set up the commands to be executed by the controller state machine 126, to hold the status distributed by the bus 32, etc. These registers 130 are addressable for read or write from the CPUs in the address space of the CPUs. A bus interface 131 communicates with the VMEbus 28, under control of the controller 126. The bus 28 includes an address bus 28a, a data bus 28b, a control bus 28c, and radials 28d, and all of these lines are communicated through the bus interface modules 29 to the I/O controllers 30; the bus interface module 29 contains a multiplexer 132 to allow only one set of bus lines 28 (from one I/O processor or the other but not both) drive the controller 30. Internal to the controller 30 are command, control, status and data registers 133 which (as is standard practice for peripheral controllers of this type) are addressable from the CPUs 11, 12 and 13 for read and write to initiate and control operations in I/O devices.

Each one of the I/O controllers 30 on the VMEbuses 28 has connections via a multiplexer 132 in the BIM 29 to both I/O processors 26 and 27 and can be controlled by either one, but is bound to one or the other by the program executing in the CPUs. A particular address (or set of addresses) is established for control and data-transfer registers 133 representing each controller 30, and these addresses are maintained in an I/O page table (normally in the kernel data section of local memory) by the operating system. These addresses associate each controller 30 as being accessible only through either I/O processor #1 or #2, but not both. That is, a different address is used to reach a particular register 133 via I/O processor 26 compared to I/O processor 27. The bus interface 131 (and controller 126) can switch the multiplexer 132 to accept bus 28 from one or the other, and this is done by a write to the registers 130 of the I/O processors from the CPUs. Thus, when the device driver is called up to access this controller 30, the operating system uses these addresses in the page table to do it. The processors 40 access the controllers 30 by I/O writes to the control and data-transfer registers 133 in these controllers using the write buffer bypass path 52, rather than through the write buffer 50, so these are synchronous writes, voted by circuits 100, passed through the memory modules to the busses 24 or 25, thus to the selected bus 28; the processors 40 stall until the write is completed. The I/O processor board of FIG. 6 is configured to detect certain failures, such as improper commands, time-outs where no response is received over VMEbus 28, parity-checked data if implemented, etc., and when one of these failures is detected the I/O processor quits responding to bus traffic, i.e., quits sending address acknowledge and data acknowledge as discussed above with reference to FIG. 7. This is detected by the bus interface 56 as a bus fault, resulting in an interrupt as will be explained, and self-correcting action if possible.

SYNCHRONIZATION

The processors 40 used in the illustrative embodiment are of pipelined architecture with overlapped instruction execution, as discussed above. A synchronization technique used in this embodiment relies upon cycle counting, i.e., incrementing a counter 71 and a counter 73 of FIG. 2 every time an instruction is executed, generally as set forth in copending applications Ser. No. 282,538, Ser. No. 283,139, or Ser. No. 283,141, and application Ser. No. 118,503. Every time the pipeline advances an instruction is executed. One of the control lines in the control bus 43 is a signal RUN# which indicates that the pipeline is stalled; when RUN# is high the pipeline is stalled, when RUN# is low (logic zero) the pipeline advances each machine cycle. This RUN# signal is used in the numeric processor 46 to monitor the pipeline of the processor 40 so this coprocessor 46 can run in lockstep with its associated processor 40. This RUN# signal in the control bus 43 along with the clock 17 are used by the counters 71 and 73 to count Run cycles.

The size of the counter register 71, in a preferred embodiment, is chosen to be 4096, i.e., $2^{12}$, which is selected because the tolerances of the crystal oscillators used in the clocks 17 are such that the drift in about 4K Run cycles on average results in a skew or difference in number of cycles run by a processor chip 40 of about all that can be reasonably allowed for proper operation of the interrupt synchronization. One synchronization mechanism is to force action to cause the CPUs to synchronize whenever the counter 71 overflows. One such action is to force a cache miss in response to an overflow signal OVFL from the counter 71; this can be done by merely generating a false Miss signal (e.g., TagValid bit not set) on control bus 43 for the next I-cache reference, thus forcing a cache miss exception routine to be entered and the resultant memory reference will produce synchronization just as any memory reference does. Another method of forcing synchronization upon overflow of counter 71 is by forcing a stall in the processor 40, which can be done by using the overflow signal OVFL to generate a CP Busy (coprocessor busy) signal on control bus 43 via logic circuit 71a of FIG. 2; this CP Busy signal always results in the processor 40 entering stall until CP Busy is deasserted. All three processors will enter this stall because they are executing the same code and will count the same cycles in their counter 71, but the actual time they enter the stall will vary; the logic circuit 71a receives the RUN# signal from bus 43 of the other two processors via input R#, so when all three have stalled the CP Busy signal is released and the processors will come out of stall in synch again.

Thus, two synchronization techniques have been described, the first being the synchronization resulting from voting the memory references in circuits 100 in the memory modules, and the second by the overflow of counter 71 as just set forth. In addition, interrupts are synchronized, as will be described below. It is important to note, however, that the processors 40 are basically running free at their own clock speed, and are substantially decoupled from one another, except when synchronizing events occur. The fact that pipelined microprocessors are used would make lock-step synchronization with a single clock more difficult, and would degrade performance; also, use of the write buffer 50 serves to decouple the processors, and would be much less effective with close coupling of the processors. Likewise, the high-performance resulting from using instruction and data caches, and virtual memory management with the TLBs 83, would be more difficult to implement if close coupling were used, and performance would suffer.

INTERRUPT SYNCHRONIZATION

The interrupt synchronization technique must distinguish between real time and so-called "virtual time". Real time is the external actual time, clock-on-the-wall time, measured in seconds, or for convenience, measured in machine cycles which are 60-nsec divisions in the example. The clock generators 17 each produce clock pulses in real time, of course. Virtual time is the internal cycle-count time of each of the processor chips 40 as measured in each one of the cycle counters 71 and 73, i.e., the instruction number of the instruction being executed by the processor chip, measured in instructions since some arbitrary beginning point.

The three CPUs of the system of FIGS. 1-3 are required to function as a single logical processor, thus requiring that the CPUs adhere to certain restrictions regarding their internal state to ensure that the programming model of the three CPUs is that of a single logical processor. Except in failure modes and in diagnostic functions, the instruction streams of the three CPUs are required to be identical. If not identical, then voting global memory accesses at voting circuitry 100 of FIG. 4 would be difficult; the voter would not know whether one CPU was faulty or whether it was executing a different sequence of instructions. The synchronization scheme is designed so that if the code stream of any CPU diverges from the code stream of the other CPUs, then a failure is assumed to have occurred. Interrupt synchronization provides one of the mechanisms of maintaining a single CPU image.

All interrupts are required to occur synchronous to virtual time, ensuring that the instruction streams of the three processors CPU-A, CPU-B and CPU-C will not diverge as a result of interrupts (there are other causes of divergent instruction streams, such as one processor reading different data than the data read by the other processors). Several scenarios exist whereby interrupts occurring asynchronous to virtual time would cause the code streams to diverge. For example, an interrupt causing a context switch on one CPU before process A completes, but causing the context switch after process A completes on another CPU would result in a situation where, at some point later, one CPU continues executing process A, but the other CPU cannot execute process A because that process had already completed. If in this case the interrupts occurred asynchronous to virtual time, then just the fact that the exception program counters were different could cause problems. The act of writing the exception program counters to global memory would result in the voter detecting different data from the three CPUs, producing a vote fault.

Certain types of exceptions in the CPUs are inherently synchronous to virtual time. One example is a breakpoint exception caused by the execution of a breakpoint instruction. Since the instruction streams of the CPUs are identical, the breakpoint exception occurs at the same point in virtual time on all three of the CPUs. Similarly, all such internal exceptions inherently occur synchronous to virtual time. For example, TLB exceptions are internal exceptions that are inherently synchronous. TLB exceptions occur because the virtual page number does not match any of the entries in the TLB 83. Because the act of translating addresses is solely a function of the instruction stream (exactly as in the case of the breakpoint exception), the translation is inherently synchronous to virtual time. In order to ensure that TLB exceptions are synchronous to virtual time, the state of the TLBs 83 must be identical in all three of the CPUs 11, 12 and 13, and this is guaranteed because the TLB 83 can only be modified by software. Again, since all of the CPUs execute the same instruction stream, the state of the TLBs 83 are always changed synchronous to virtual time. So, as a general rule of thumb, if an action is performed by software then the action is synchronous to virtual time. If an action is performed by hardware, which does not use the cycle counters 71, then the action is generally synchronous to real time.

External exceptions are not inherently synchronous to virtual time. I/O devices 26, 27 or 30 have no information about the virtual time of the three CPUs 11, 12 and 13. Therefore, all interrupts that are generated by these I/O devices must be synchronized to virtual time before presenting to the CPUs, as explained below. Floating point exceptions are different from I/O device interrupts because the floating point coprocessor 46 is tightly coupled to the microprocessor 40 within the CPU.

External devices view the three CPUs as one logical processor, and have no information about the synchronaity or lack of synchronaity between the CPUs, so the external devices cannot produce interrupts that are synchronous with the individual instruction stream (virtual time) of each CPU. Without any sort of synchronization, if some external device drove an interrupt at some instant of real time, and the interrupt was presented directly to the CPUs at this time then the three CPUs would take an exception trap at different instructions, resulting in an unacceptable state of the three CPUs. This is an example of an event (assertion of an interrupt) which is synchronous to real time but not synchronous to virtual time.

Figure 8:
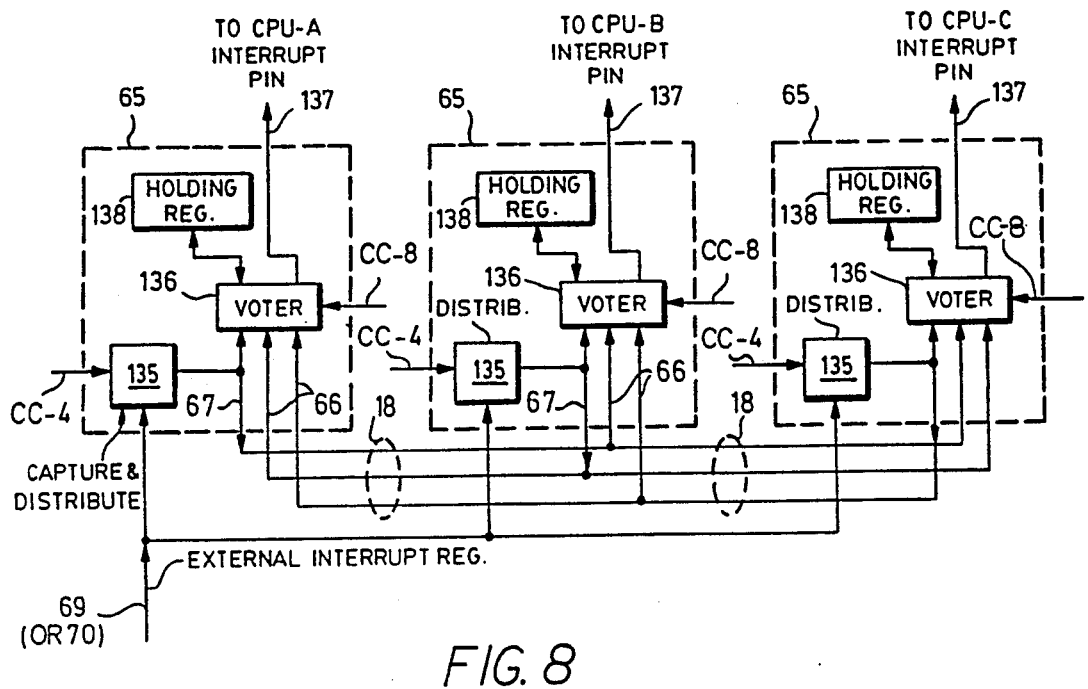
FIG. 8 is an electrical schematic diagram in block form of the interrupt synchronization circuit used in the CPU of FIG. 2.

Interrupts are synchronized to virtual time in the system of FIGS. 1-3 by performing a distributed vote on the interrupts and then presenting the interrupt to the processor on a predetermined cycle count. FIG. 8 shows a more detailed block diagram of the interrupt synchronization logic 65 of FIG. 2. Each CPU contains a distributor 135 which captures the external interrupt from the line 69 or 70 coming from the modules 14 or 15; this capture occurs on a predetermined cycle count, e.g., at count-4 as signalled on an input line CC-4 from the counter 71. The captured interrupt is distributed to the other two CPUs via the inter-CPU bus 18. These distributed interrupts are called pending interrupts. There are three pending interrupts, one from each CPU 11, 12 and 13. A voter circuit 136 captures the pending interrupts and performs a vote to verify that all of the CPUs did receive the external interrupt request. On a predetermined cycle count (detected from the cycle counter 71), in this example cycle-8 received by input line CC-8, the interrupt voter 136 presents the interrupt to the interrupt pin on its respective microprocessor 40 via line 137 and control bus 55 and 43. Since the cycle count that is used to present the interrupt is predetermined, all of the microprocessors 40 will receive the interrupt on the same cycle count and thus the interrupt will have been synchronized to virtual time.

MEMORY MANAGEMENT

Figures 9, 10:
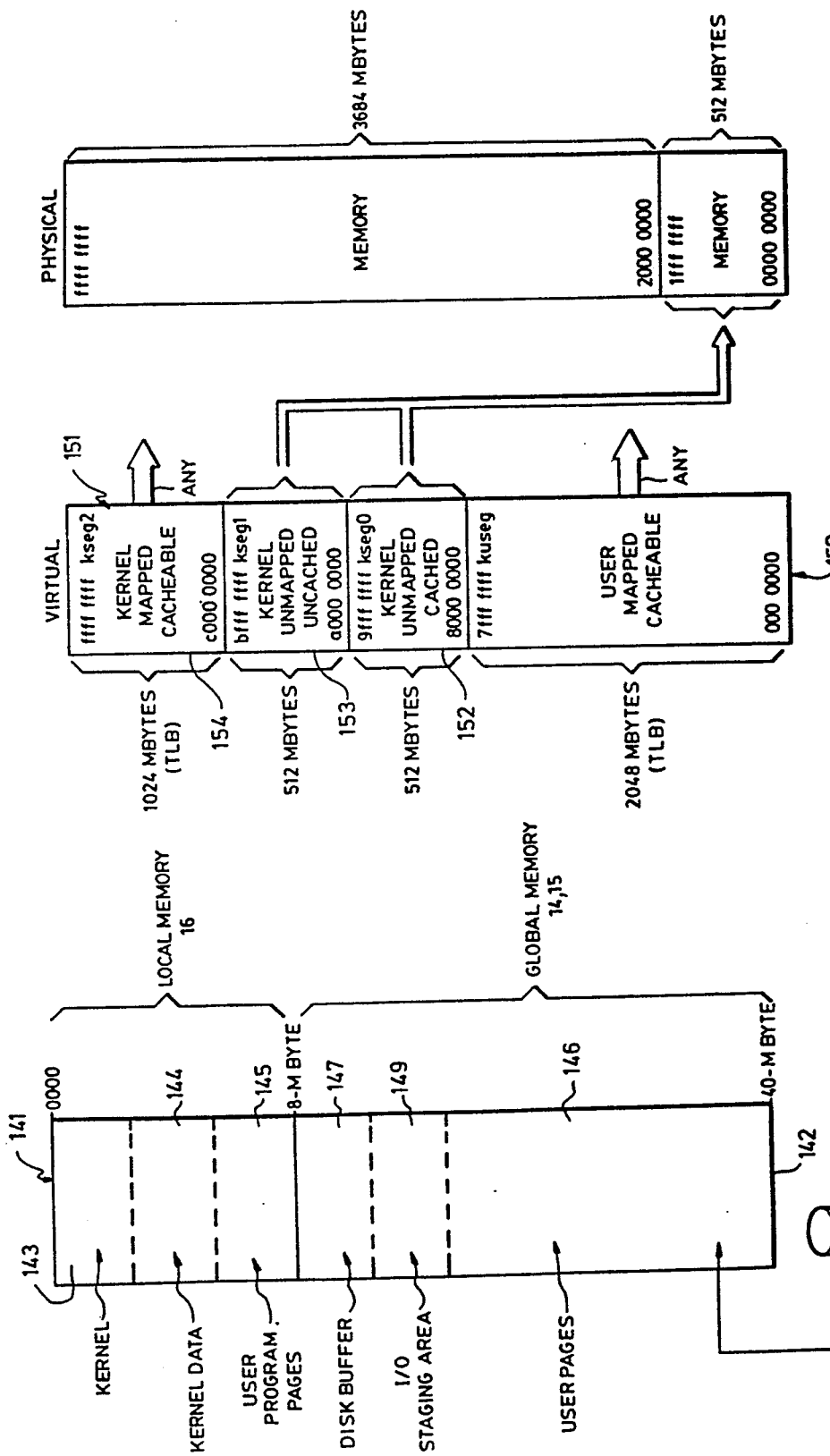
FIG. 9 is a physical memory map of the memories used in the system of FIGS. 1, 2, 3 and 4.
FIG. 10 is a virtual memory map of the CPUs used in the system of FIGS. 1, 2, 3 and 4.

The CPUs 11, 12 and 13 of FIGS. 1-3 have memory space organized as illustrated in FIG. 9. Using the example that the local memory 16 is 8-MByte and the global memory 14 or 15 is 32-MByte, note that the local memory 16 is part of the same continuous zero-to-40M map of CPU memory access space, rather than being a cache or a separate memory space; realizing that the 0-8M section is triplicated (in the three CPU modules), and the 8-40M section is duplicated, nevertheless logically there is merely a single 0-40M physical address space. An address over 8-MByte on bus 54 causes the bus interface 56 to make a request to the memory modules 14 and 15, but an address under 8-MByte will access the local memory 16 within the CPU module itself. Performance is improved by placing more of the memory used by the applications being executed in local memory 16, and so as memory chips are available in higher densities at lower cost and higher speeds, additional local memory will be added, as well as additional global memory. For example, the local memory might be 32-MByte and the global memory 128-MByte. On the other hand, if a very minimum-cost system is needed, and performance is not a major determining factor, the system can be operated with no local memory, all main memory being in the global memory. area (in memory modules 14 and 15), although the performance penalty is high for such a configuration.

The content of local memory portion 141 of the map of FIG. 9 is identical in the three CPUs 11, 12 and 13. Likewise, the two memory modules 14 and 15 contain identically the same data in their space 142 at any given instant. Within the local memory portion 141 is stored the kernel 143 (code) for the Unix operating system, and this area is physically mapped within a fixed portion of the local memory 16 of each CPU. Likewise, kernel data is assigned a fixed area 144 in each local memory 16; except upon boot-up, these blocks do not get swapped to or from global memory or disk. Another portion 145 of local memory 16 is employed for user program (and data) pages, which are swapped to area 146 of the global memory 14 and 15 under control of the operating system. The global memory area 142 is used as a staging area for user pages in area 146, and also as a disk buffer in an area 147; if the CPUs are executing code which performs a write of a block of data or code from local memory 16 to disk 148, then the sequence is to always write to a disk buffer area 147 instead because the time to copy to area 147 is negligible compared to the time to copy directly to the I/O processor 26 and 27 and thus via I/O controller 30 to disk 148. Then, while the CPUs proceed to execute other code, the write-to-disk operation is done, transparent to the CPUs, to move the block from area 147 to disk 148. In a like manner, the global memory area 146 is mapped to include an I/O staging 149 area, for similar treatment of I/O accesses other than disk (e.g., video).

The physical memory map of FIG. 9 is correlated with the virtual memory management system of the processor 40 in each CPU. FIG. 10 illustrates the virtual address map of the R2000 processor chip used in the example embodiment, although it is understood that other microprocessor chips supporting virtual memory management with paging and a protection mechanism would provide corresponding features.

In FIG. 10, two separate 2-GByte virtual address spaces 150 and 151 are illustrated; the processor 40 operates in one of two modes, user mode and kernel mode. The processor can only access the area 150 in the user mode, or can access both the areas 150 and 151 in the kernel mode. The kernel mode is analogous to the supervisory mode provided in many machines. The processor 40 is configured to operate normally in the user mode until an exception is detected forcing it into the kernel mode, where it remains until a restore from exception (RFE) instruction is executed. The manner in which the memory addresses are translated or mapped depends upon the operating mode of the microprocessor, which is defined by a bit in a status register. When in the user mode, a single, uniform virtual address space 150 referred to as "kuseg" of 2-GByte size is available. Each virtual address is also extended with a 6-bit process identifier (PID) field to form unique virtual addresses for up to sixty-four user processes. All references to this segment 150 in user mode are mapped through the TLB 83, and use of the caches 144 and 145 is determined by bit settings for each page entry in the TLB entries; i.e., some pages may be cachable and some not as specified by the programmer.

When in the kernel mode, the virtual address space includes both the areas 150 and 151 of FIG. 10, and this space has four separate segments kuseg 150, kseg0 152, kseg1 153 and kseg2 154. The kuseg 150 segment for the kernel mode is 2-GByte in size, coincident with the "kuseg" of the user mode, so when in the kernel mode the processor treats references to this segment just like user mode references, thus streamlining kernel access to user data. The kuseg 150 is used to hold user code and data, but the operating system often needs to reference this same code or data. The kseg0 area 152 is a 512-MByte kernel physical address space direct-mapped onto the first 512-MBytes of physical address space, and is cached but does not use the TLB 83; this segment is used for kernel executable code and some kernel data, and is represented by the area 143 of FIG. 9 in local memory 16. The kseg1 area 153 is also directly mapped into the first 512-MByte of physical address space, the same as kseg0, and is uncached and uses no TLB entries. Kseg1 differs from kseg0 only in that it is uncached. Kseg1 is used by the operating system for I/O registers, ROM code and disk buffers, and so corresponds to areas 147 and 149 of the physical map of FIG. 9. The kseg2 area 154 is a 1-GByte space which, like kuseg, uses TLB 83 entries to map virtual addresses to arbitrary physical ones, with or without caching. This kseg2 area differs from the kuseg area 150 only in that it is not accessible in the user mode, but instead only in the kernel mode. The operating system uses kseg2 for stacks and per-process data that must remap on context switches, for user page tables (memory map), and for some dynamically-allocated data areas. Kseg2 allows selective caching and mapping on a per page basis, rather than requiring an all-or-nothing approach.

Figure 11:
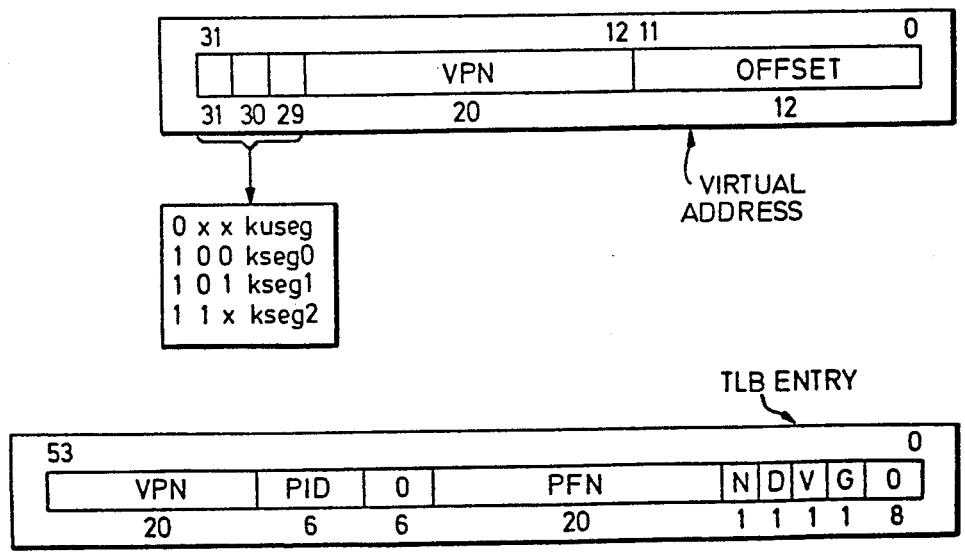
FIG. 11 is a diagram of the format of the virtual address and the TLB entries in the microprocessor chips in the CPU according to FIG. 2 or 3.

The 32-bit virtual addresses generated in the registers 76 or PC 80 of the microprocessor chip and output on the bus 84 are represented in FIG. 11, where it is seen that bits 0-11 are the offset used unconditionally as the low-order 12-bits of the address on bus 42 of FIG. 3, while bits 12-31 are the VPN or virtual page number in which bits 29-31 select between kuseg0, kseg1 and kseg2. The process identifier PID for the currently-executing process is stored in a register also accessible by the TLB. The 64-bit TLB entries are represented in FIG. 11 as well, where it is seen that the 20-bit VPN from the virtual address is compared to the 20-bit VPN field located in bits 44-63 of the 64-bit entry, while at the same time the PID is compared to bits 38-43; if a match is found in any of the sixty-four 64-bit TLB entries, the page frame number PFN at bits 12-31 of the matched entry is used as the output via busses 82 and 42 of FIG. 3 (assuming other criteria are met). Other one-bit values in a TLB entry include N, D, V and G. N is the non-cachable indicator, and if set the page is non-cachable and the processor directly accesses local memory or global memory instead of first accessing the cache 44 or 45. D is a write-protect bit, and if set means that the location is "dirty" and therefore writable, but if zero a write operation causes a trap. The V bit means valid if set, and allows the TLB entries to be cleared by merely resetting the valid bits; this V bit is used in the page-swapping arrangement of this system to indicate whether a page is in local or global memory. The G bit is to allow global accesses which ignore the PID match requirement for a valid TLB translation; in kseg2 this allows the kernel to access all mapped data without regard for PID.

The device controllers 30 cannot do DMA into local memory 16 directly, and so the global memory is used as a staging area for DMA type block transfers, typically from disk 148 or the like. The CPUs can perform operations directly at the controllers 30, to initiate or actually control operations by the controllers (i.e., programmed I/O), but the controllers 30 cannot do DMA except to global memory; the controllers 30 can become the VMEbus (bus 28) master and through the I/O processor 26 or 27 do reads or writes directly to global memory in the memory modules 14 and 15.

Page swapping between global and local memories (and disk) is initiated either by a page fault or by an aging process. A page fault occurs when a process is executing and attempts to execute from or access a page that is in global memory or on disk; the TLB 83 will show a miss and a trap will result, so low level trap code in the kernel will show the location of the page, and a routine will be entered to initiate a page swap. If the page needed is in global memory, a series of commands are sent to the DMA controller 74 to write the least-recently-used page from local memory to global memory and to read the needed page from global to local. If the page is on disk, commands and addresses (sectors) are written to the controller 30 from the CPU to go to disk and acquire the page, then the process which made the memory reference is suspended. When the disk controller has found the data and is ready to send it, an interrupt is signalled which will be used by the memory modules (not reaching the CPUs) to allow the disk controller to begin a DMA to global memory to write the page into global memory, and when finished the CPU is interrupted to begin a block transfer under control of DMA controller 74 to swap a least used page from local to global and read the needed page to local. Then, the original process is made runnable again, state is restored, and the original memory reference will again occur, finding the needed page in local memory. The other mechanism to initiate page swapping is an aging routine by which the operating system periodically goes through the pages in local memory marking them as to whether or not each page has been used recently, and those that have not are subject to be pushed out to global memory. A task switch does not itself initiate page swapping, but instead as the new task begins to produce page faults pages will be swapped as needed, and the candidates for swapping out are those not recently used.

If a memory reference is made and a TLB miss is shown, but the page table lookup resulting from the TLB miss exception shows the page is in local memory, then a TLB entry is made to show this page to be in local memory. That is, the process takes an exception when the TLB miss occurs, goes to the page tables (in the kernel data section), finds the table entry, writes to TLB, then the process is allowed to proceed. But if the memory reference shows a TLB miss, and the page tables show the corresponding physical address is in global memory (over 8M physical address), the TLB entry is made for this page, and when the process resumes it will find the page entry in the TLB as before; yet another exception is taken because the valid bit will be zero, indicating the page is physically not in local memory, so this time the exception will enter a routine to swap the page from global to local and validate the TLB entry, so execution can then proceed. In the third situation, if the page tables show address for the memory reference is on disk, not in local or global memory, then the system operates as indicated above, i.e., the process is put off the run queue and put in the sleep queue, a disk request is made, and when the disk has transferred the page to global memory and signalled a command-complete interrupt, then the page is swapped from global to local, and the TLB updated, then the process can execute again.

FAULT-TOLERANT POWER SUPPLY

Figure 12:
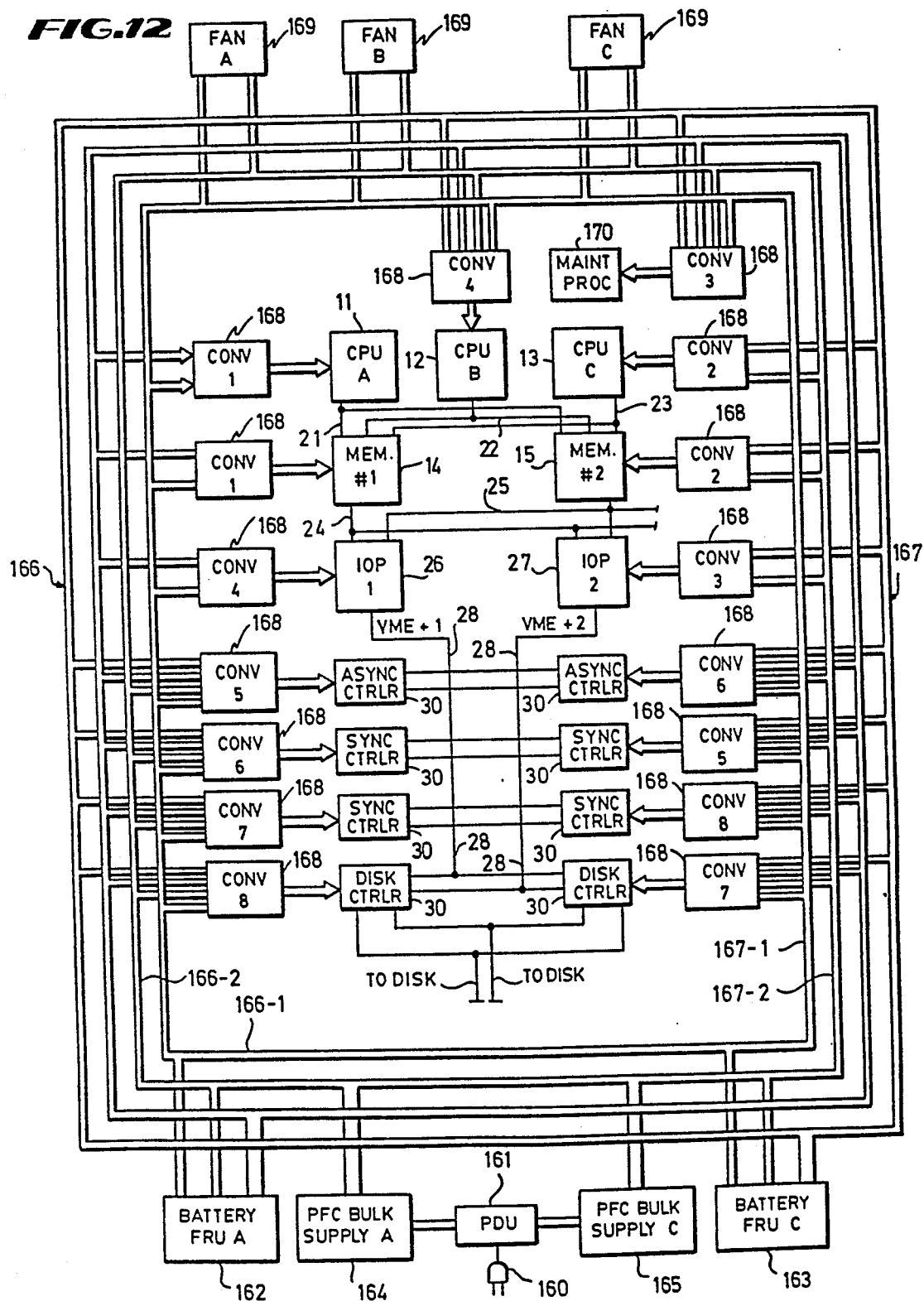
FIG. 12 is an electrical diagram of a fault-tolerant power supply used with the system of the invention according to one embodiment.

Referring now to FIG. 12, the system of the preferred embodiment may use a fault-tolerant power supply which provides the capability for on-line replacement of failed power supply modules, as well as on-line replacement of CPU modules, memory modules, I/O processor modules, I/O controllers and disk modules as discussed above. In the circuit of FIG. 12, an a/c power line 160 is connected directly to a power distribution unit 161 that provides power line filtering, transient suppressors, and a circuit breaker to protect against short circuits. To protect against a/c power line failure, redundant battery packs 162 and 163 provide 4½ minutes of full system power so that orderly system shutdown can be accomplished. Only one of the two battery packs 162 or 163 is required to be operative to safely shut the system down.

The power subsystem has two identical AC to DC bulk power supplies 164 and 165 which exhibit high power factor and energize a pair of 36-volt DC distribution busses 166 and 167. The system can remain operational with one of the bulk power supplies 164 or 165 operational.

Four separate power distribution busses are included in these busses 166 and 167. The bulk supply 164 drives a power bus 166-1, 167-1, while the bulk supply 165 drives power bus 166-2, 167-2. The battery pack 162 drives bus 166-3, 167-3, and is itself recharged from both 166-1 and 166-2. The battery pack 163 drives bus 166-3, 167-3 and is recharged from busses 166-1 and 166-2. The three CPUs 11, 12 and 13 are driven from different combinations of these four distribution busses.

A number of DC-to-DC converters 168 connected to these 36-v busses 166 and 167 are used to individually power the CPU modules 11, 12 and 13, the memory modules 14 and 15, the I/O processors 26 and 27, and the I/O controllers 30. The bulk power supplies 164 and 165 also power the three system fans 169, and battery chargers for the battery packs 162 and 163. By having these separate DC-to-DC converters for each system component, failure of one converter does not result in system shutdown, but instead the system will continue under one of its failure recovery modes discussed above, and the failed power supply component can be replaced while the system is operating.

The power system can be shut down by either a manual switch (with standby and off functions) or under software control from a maintenance and diagnostic processor 170 which automatically defaults to the power-on state in the event of a maintenance and diagnostic power failure.

The /config filesystem

Figure 13:
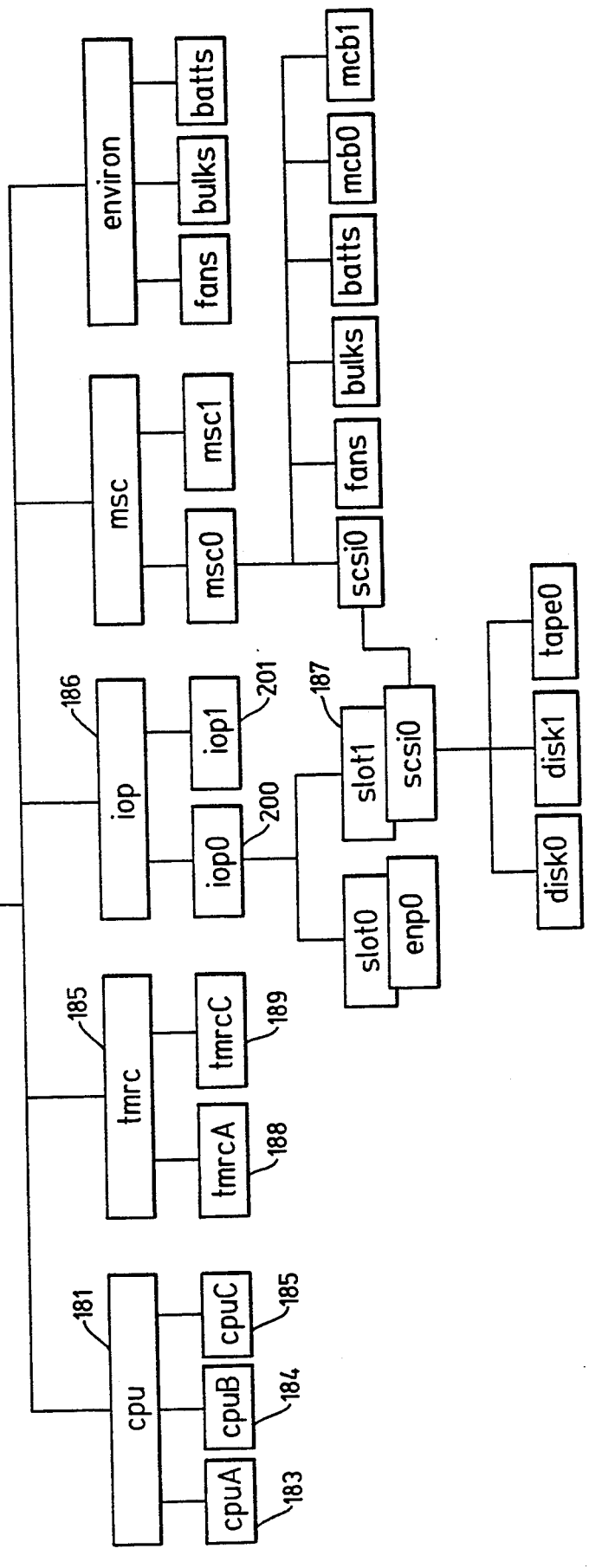
FIG. 13 is a diagram of the tree structure of the /config filesystem according to one embodiment of the invention.

To allow user programs to access the current configuration of the system described above, a pseudo filesystem is added, referred to as the /config filesystem. A file exists in /config for each software subsystem and each hardware component in the system. Referring to FIG. 13, a tree structure is illustrated for this /config filesystem. A directory listing for /config will always show the true configuration of the system, which is of great importance to a system as shown above where the configuration can change while the system is running.

The hardware subtree 180 of FIG. 13 represents the current physical hardware configuration of the system of FIGS. 1-12. Only the hardware actually present in the system is present as an entry in the /config filesystem. For example, if there is no memory board C (memory module 15 of FIG. 1) present in slot C the corresponding node tmrcC will not appear in the tmrc directory. When components are added to or removed from the system the hardware subtree 180 is updated. Within the hardware subtree 180 is a subtree 181 for the CPUs, and under this subtree are three possible files 182, 183 and 184, representing the CPUs 11, 12 and 13, which appear as files /config/hw/cpu/cpuA, /config/hw/cpu/cpuB, etc. Likewise, there is a subtree 185 for the memory modules 14 and 15, where files /config/hw/tmrc/tmrcA and /config/hw/tmrc/tmrcC appear if both memory modules 14 and 15 are present. A subtree 186 for the I/O processors 26 and 27 has subtrees /config/hw/iop/iop0/ and /config/hw/iop/iop1/ for the processors 26 and 27, then each of these has VME controllers 30 which are each represented by a file linked to a .slot file 187 corresponding to the VME slot the controller occupies. For SCSI type controllers there is a single controller which appears as a link in both the iop and the msc directories. When viewed with ls() the links between the controllers appear as hard filesystem links.

The software subtree 190 represents the current software configuration of the system, although the software system components are more nebulous than the analogous hardware components in the hardware subtree 180. Not all of the routines in the system are identified with a particular software component, but there are a number of components which can be treated as a software subsystem and have associated start and stop routines. Some, but not all, may also have subsystem reinitialization and re-integration routines. A major distinction from the hardware subtree is that the software subtree has no replicated components.

USER INTERFACE FOR /CONFIG FILESYSTEM

The /config filesystem is a front end to various kernel modules, and /config provides a mechanism for identifying components of a particular kernel module by name and directing system calls to that kernel module. /Config is automatically mounted during the boot process, to ensure that it will be available for examination by any /etc/rc programs. Since /config is not mounted by mount(1) there will be no corresponding entry in /etc/mtab, and so there is no unnecessary information to confuse the user.

The nodes in /config may be treated just like regular files in Unix. All files operations may be attempted, though some are not supported and will return errors. User interface to /config is through standard Unix system calls. A summary of the system call support is set forth in Table A, where the column on the left recites standard Unix calls. The system calls can be made from within custom programs or from any commands which make these system calls (e.g., ls(1)). Most of these operations are performed by opening the desired entity then issuing an ioctl(2) system call; for example, to issue a call to the reintegration subsystem to down cpuB (the CPU 12), the following code is executed:

```
fd = open ("/config/hardward/cpu/cpuB", O_RDWR);
ioctl(fd, CF_DOWN, 0);      /* down (put off-line) cpuB */
```

The nodes in the /config filesystem support common commands, particularly some subset of the ioctl calls defined in the /config filesystem header cfs.h:

CF_GETSTATE: get state code (integer)
CF_PGET: get parameter block
CF_PSET: set parameter block
CF_INIT: initialize
CF_DIAG: run diagnostics
CF_DOWN: take unit down
CF_REINT: reintigrate
CF_OFFLINE: put offline
CF_RESET: reset
CF_MOVE: move (IOP)
CF_FAILED: mark as failed
CF_CTRLINFO: get pdev/Idev info
CF_CONFIG: get config_file array.

All nodes support CF_GETSTATE:

```
int state;
ioctl(fd, CF_GETSTATE, &state);
```

The meaning of the return code, state, varies from component to component except that a value of zero indicates normal operating state and non-zero indicates otherwise. Other values of state may be defined for particular components.

KERNEL INTERFACE

The /config filesystem is intended to be simply a shell which performs all the filesystem operations necessary to provide an illusion of files, but has no direct knowledge of the entities it is displaying. With the use of def procs key system calls, such as read(), write() and ioctl(), are passed on to other kernel modules. Other kernel modules tie into /config through entries in the /config inode (information node) table. The /config inode table is a linked list of data structures of the type cf_t:

```
typedef struct cf_inode {
    char            *cf_name;       /* ascii name */
    ushort          cf_unitnum;     /* if >=0 && <100, appended to
                                       cf_name */
    ushort          cf_mode;        /* mode for chmod(1) */
    int             cf_size;        /* size */
    cf_id_t         cf_id;          /* unique ID, first arg for
                                       procs */
    cfproc t        *cf procs;      /* list cf defprocs */
    time_t          cf _ctime;      /* same a in stat.h */
    time_t          cf_mtime;       /* same as in stat.h */
    /* ... */
    struct cf_inode *cf_next;       /* next entry in same
                                       hierarchy */
    struct cf_inode *cf_sub;        /* first entry in sub directory */
    struct cf_inode *cf_pard;       /* parent directory */
    struct cf_inode *cf_link;       /* list of links */
} cf_t;
```

Each cf_t defines a particular file or directory (directory if S_IFDIR is set in cf_mode). Together they make up the directory tree structure which the user sees, as illustrated in FIG. 13.

When a user issues a system call, /config will either satisfy that request or pass the request on to the associated kernel module. Each node has a list of procedures (cf_procs) corresponding to the supported operations: open, close, read, write, attr, and ioctl. The first argument passed to a procedure is the value stored in the cf_id field. This field may contain any value, but will typically store an address or unit number to aid in identifying the target of the system call. The value must be unique.

A program listing for the include file for /config filesystem to create the sub-trees of FIG. 13 is set forth in Table D. Creation of the filesystem is also illustrated at 200 in FIG. 14.

Figure 14:
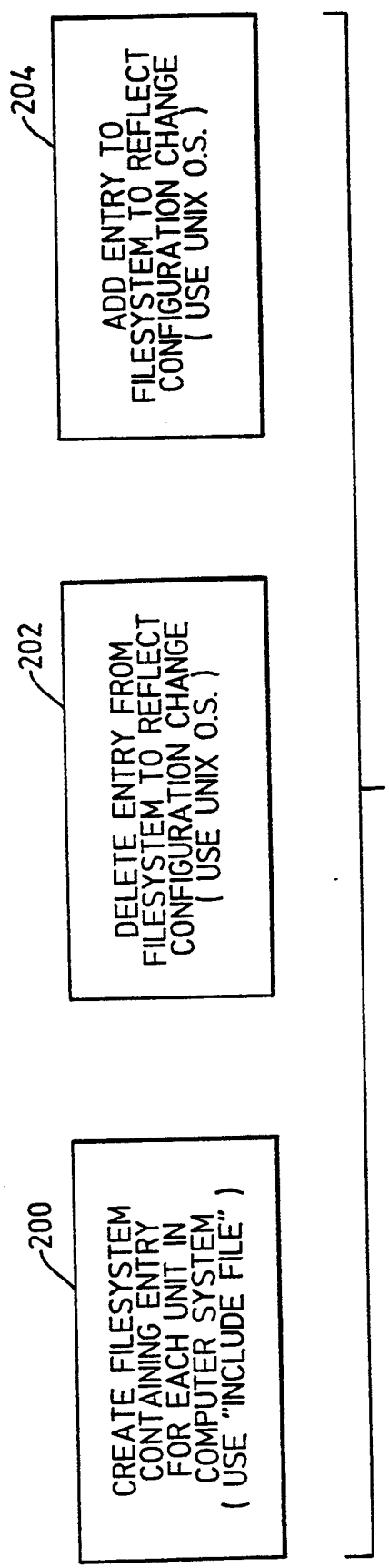
FIG. 14 is a block diagram illustrating the method of the present invention including the steps of creating a filesystem, deleting entries from the filesystem and adding entries to the filesystem.

All kernel modules which use /config must perform all add, remove, and update operations to the /config tree of FIG. 13. For the hardware subtree a series of easy-to-use interface routines is available as set forth in Table B. These routines are grouped according to the applicable hardware section. They are used to delete entries from and add entries to /config, as illustrated in FIG. 14 at 202 and 204, respectively. Interface routines for the software subtree are beyond the scope of this application.

An example of an ls() command is set forth in Table C. This table shows selected output from an ls() command.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE A

| System Call | Action | |
|---|---|---|
| open | RDONLY | everyone |
|  | RDWR | su only |
| read/write | † | |
| stat/fstat | st_dev | = maj/min of /config ‡ |

TABLE A-continued

| System Call | Action | |
|---|---|---|
| | st_ino | = inode number in filesystem |
| | st_mode | = † |
| | st_nlink | = number of links |
| | st_uid | = always zero (root) |
| | st_gid | = always zero (root) |
| | st_rdev | = always zero |
| | st_size | = |
| | st_atime | = always current time |
| | st_mtime | = † |
| | st_ctime | = † |
| ioctl | † | |
| chmod | † | |
| access | IREAD | everyone |
| | IWRITE | su only |
| | IEXEC | IFDIR everyone |
| mount | filesystem remounted | |
| umount | filesystem unmounted | |
| statfs | f_fstyp | = filesystem type number ‡ |
| | f_bsize | = 1024 |
| | f_frsize | = 0 |
| | f_blocks | = 0 |
| | f_bfree | = 0 |
| | f_files | = 0 |
| | f_ffree | = 0 |
| | f_fname | = "/config" |
| | f_fpack | = "/config" |
| chown | returns EINVAL | |
| creat | returns EINVAL | |
| link | returns EINVAL | |
| rename | returns EINVAL | |
| unlink | returns EINVAL | |
| fcntl | default commands are transparent others return EINVAL | |
| close | † | |
| dup | transparent-fs is not notified | |
| lseek | transparent-fs is not notified | |
| utime | transparent-fs is not notified | |

Note:
† action is defined by subtree code.
‡ determined dynamically at boot time.
Items marked with a † in the above table indicate that the action is not performed by/config, but is passed through.

TABLE B

CPU routines cf_cpu_add:
    cf_cpu_add(unit)
    int unit;
Add cpu unit to the tree.
cf_cpu_rm:
    cf_cpu_rm(unit)
    int unit;
Remove cpu unit from the tree.

TMRC routines cf_tmrc_add:
    cf_tmrc_add(unit)
    int unit;
Add tmrc unit to the tree.
cf_tmrc_rm:
    cf_tmrc_rm(unit)
    int unit;
Remove tmrc unit from the tree.

IOP routines cf_iop_add:
    cf_iop_add(unit)
    int unit;
Create a new iop in the directory/config/hw/iop and add the eight .sot entries.
cf_iop_rm:
    cf_iop_rm(unit)
    int unit;
Remove iop unit, all sub-units, and any msc links.
cf_iop_state:
    cf_iop_state(unit,state)
    int unit, state;
Change the state of the unit. State is (0) for failed, (1) for normal.

Controller routines

TABLE B-continued cf_ctlr_add:
    cf_ctlr_add(pd)
    pdev_t *pd;
Create a link to the node:
    /config/hw/iop/iop$_n$/.slot$_m$
All information is taken from the pd (iop/slot number, ascii name, and unit number).
cf_ctlr_rm:
    cf_add_rm(pd)
    pdev_t *pd;
Remove the controller node, any subdevices, and msc links.
cf_ctlr_move:
    cf_ctlr_move(pd)
    pdev_t *pd;
Move the controller and any local devices to iop 1. The id fields of the controller and ldevs are updated to reflect the new iop number.
cf_ctlr_state:
    cf_ctlr_state(pd,state)
    pdev_t *pd;
    int state;
Set state of controller. State is (0) for failed, (1) for normal.

Local Device routines cf_ldev_add:
    cf_ldev_add(pd, subunit, name, appendunit)
    pdev_t *pd;
    int subunit;
    char *name;
    int appendunit;
Create or rename a node in the/config filesystem in the directory:
    /config/hw/iop/iop$_n$/controller
The argument pd determines iop/iop$_n$ and controller. Subunit is an integer index indicating the sub-unit being created. Name is the ascii name which is to be displayed in /config. Only the pointer to the name is saved-space must be allocated by the device driver. If appendunit is non-zero the sub-unit number will be appended to the ascii name (handy for names like: port0, port1, port2, ...). If the node already exists only the ascii name will be changed.
cf_ldev_rm:
    cf_ldev_rm(pd, subunit)
    pdev_t *pd;
    int subunit;
Remove local device from /config.
cf_ldev_state:
    cf_ldev_state(pd, subunit, state)
    pdev_t *pd;
    int subunit, state;
Set the state of a local devide. State is (0) for failed, (1) for normal.

MSC routines cf_msc_add:
    cf_msc_add(unit)
    int unit;
Add msc unit and the independent bus nodes mcb0 and mcb1.
cf_msc_rm:
    cf_msc_rm(unit)
    int unit;
Remove msc unit and all sub-nodes.
cf_msc_link:
    cf_msc-link(unit,pd)
    int unit;
    pdev_t *pd;
Link the controller specified by pd to msc unit.
cf_mscenv_add:
    cf-mscenv-add(unit,component)
    int unit, component;
Add environmental component to msc unit. Component is a code from cfs.h indicating: fans, batteries, bulks.
cf_mscenv_rm:
    cf_mscenv_rm(unit,component)
    int unit, component;
Remove environmental component from msc unit.
cf_mscenv_state:
    cf_mscenv_state(unit,component,state)
    int unit, component, state;
Change the state of an environmental component. State is

TABLE B-continued (0) for failed, (1) for normal.
Environ Routines
    cf_environ_add:
        cf-environ_add(component)
        int unit;
Add main-cabinet environmental component. Component is a code from cfs.h indicating: fans, batteries, bulks.
    cf_environ_rm:
        cf_msc_rm(component)
        int unit;
Remove main-cabinet environmental component.
    cf_environ_state:
        cf_environ_state(component,state)
        int unit, component, state;
Change the state of a main-cabinet environmental component. State is (0) for failed, (1) for normal.

Low Level Routines

All of the previous interface routines are built using the three low level routines.
    cf_newnode:
        cf_t *
        cf_newnode(parid)
        cf_id_t parid;
Create a new node under the directory indicated by parid. All fields in the returned structure must be filled in by hand.
    cf_linknode:
        cf_t *
        cf_linknode(parid,srcnode)
        cf_id_t parid;
Create a hard link to node srcnode under the directory indicated by parid. All fields in the returned structure must be filled in by hand.
    cf_disposenode:
        cf_disposenode(id)
        cf_id_t id;
Remove node indicated by id from the tree. All children and all links are also removed.

Miscellaneous:
    cf_findid:
        cf_t *
        cf_findid(id)
        cf_id_t id;
Return the node whose df_id field matches id.

TABLE C

| Component | mode bits | Size | State |
|---|---|---|---|
| cpu | ---x--x--x | mem size | NORMAL |
| | ---------- | | DEAD |
| | --------T | | REINTABLE |
| | (no entry) | | ABSENT |
| unrc | -rwxrwxrwx | mem size | NORMAL, primary |
| | -rw-rw-rw- | mem size | NORMAL, backup |
| | --w--w--w- | reint progress | REVIVE |
| | ---------- | | OFFLINE |
| | (no entry) | | ABSENT |
| iop | d--x--x--x | | NORMAL |
| | d--------- | | OFFLINE |
| | (no entry) | | ABSENT |
| ctlr | d--x--x--x | | OK (with subdevices) |
| | d--------- | | not-OK (with subdevices) |
| | ---x--x--x | | OK (no subdevices) |
| | ---------- | | not-OK (no subdevices) |
| | (no entry) | | ABSENT |
| subdev | ---x--x--x | | OK |
| | (no entry) | | ABSENT |
| fan | ---x--x--x | | NORMAL |
| | ---------- | | FAILED |
| | (no entry) | | ABSENT |
| bulk | ---x--x--x | | NORMAL |
| | ---------- | | FAILED |
| battery | ---x--x--x | | NORMAL |
| | ---------- | | FAILED |

TABLE D

```
10
11  /*
12   * cfs.h - include file for /config file system
13   */
14  #ifndef _sys_fs_cfs.h
15  #define _sys_fs_cfs.h
16
17  typedef unsigned long cf_id_t;  /* size of unique id field */
18
19  /*
20   * defproc structure -- each node in /config has a pointer to one of these.
21   */
22  typedef struct cfproc {
23      int     (*cf_openproc) ( );   /* called on first open of inode */
24      int     (*cf_closeproc) ( );  /* called on last close of inode */
25      int     (*cf_readproc) ( );   /* called on read inode */
26      int     (*cf_writeproc) ( );  /* called on write inode */
27      int     (*cf_attrpoc) ( );    /* called on attr change (e.g. chmod, chown) */
28      int     (*cf_ioctlproc) ( );  /* called on ioctl( ) */
29  }cfproc_t;
30
31  /*
32   * config inode - directory or plain file
33   */
34  typedef struct of_inode {
35      char        *cf_name;       /* ascii name */
36      ushort      cf_unitnum;     /* if >=0 && <100, appended to cf_name */
37      ushort      cf_mode;        /* mode for stat(2) */
38      int         cf_size;        /* size */
39      cf_id_t     cf_id;          /* unique ID, first arg for procs */
40      cfproc_t    *cf_procs;      /* list of defprocs */
41      time_t      cf_ctime;       /* same as in stat.h */
42      time_t      cf_mtime;       /* same as in stat.h */
43      /* ... */
44      struct cf_inode *cf_next;   /* next entry in same hierarchy */
45      struct cf_inode *cf_sub;    /* first entry in sub directory */
46      struct cf_inode *cf_pard;   /* parent directory */
47      struct cf_inode *cf_link;   /* list of links */
48  } cf_t;
```

TABLE D-continued

```
49
50   extern cf_t *cf_addnode ( ), *cf_linknode ( ), *cf_findid ( );
51
52   /* ioctls common to all /config entities */
53   #define CFCODE ('c'<<8)
54   #define CF_GETSTATE    (CFCODE|00)     /* get state code (integer) */
55   #define CF_PGET        (CFCODE|01)     /* get parameter block */
56   #define CF_PSET        (CFCODE|02)     /* set parameter block */
57   #define CF_INIT        (CFCODE|03)
58   #define CF_DIAG        (CFCODE|04)
59   #define CF_DOWN        (CFCODE|05)
60   #define CF_REINT       (CFCODE|06)
61   #define CF_OFFLINE     (CFCODE|07)
62   #define CF_RESET       (CFCODE|010)
63   #define CF_MOVE        (CFCODE|011)
64   #define CF_FAILED      (CFCODE|012)
65   #define CF_CTRLINFO    (CFCODE|013)    /* get pdev/ldev info */
66   #define CF_CONFIG      (CFCODE|014)    /* get config_file array */
67
68
69   /*
70    * IDs for the /config/hw branch are formed as follows
71    *
72    *     0          board type       board #     slot       subdev
73    *
74    *    1bit         7 bits          4 bits     4 bits      16 bits
75    *
76    * The high bit is always zero.
77    */
78
79   /* make id from board type, board num, slot, and subdev */
80   #define MKID(bt,bn,s,sd)     ((((bt) & 0x7F) << 24) | (((bn) & 0xF) << 20) |
81                                 (((s) & 0xF) << 16) | ((sd) & 0xFFFF))
82
83   /* get board type, board num, slot, and subdev from id */
84   #define ID_TO_BRDTYPE(id)    (((id) >> 24) & 0xFF)
85   #define ID_TO_BRDNUM(id)     (((id) >> 20) & 0xF)
86   #define ID_TO_SLOT(id)       (((id) >> 16) & 0xF)
87   #define ID_TO_SUBDEV(id)     ((id) & 0xFFFF)
88
89   #define INVALID_BRD     0xF
90   #define INVALID_SLOT    0xF
91   #define INVALID_subdev  0xFFFF
92
93   /* board types */
94   #define CPU_TYPE        1
95   #define TMRC_TYPE       2
96   #define IOP_TYPE        3
97   #define    ENVIRON_TYPE     4          /* batteries, fans, preregs */
98   #define    ENVIRON_BATT     0          /* unit offset */
99   #define    ENVIRON_FAN      2
100  #define    ENVIRON_BULK     5
101  #define MSC_TYPE        5
102
103  #define CPUDIR      MKID(CPU_TYPE,-1,-1,-1)      /* cpu directory */
104  #define CPUA        MKID(CPU_TYPE,0,-1,-1)
105  #define CPUB        MKID(CPU_TYPE,1,-1,-1)
106  #define CPUC        MKID(CPU_TYPE,2,-1,-1)
107  #define TMRCDIR     MKID(TMRC_TYPE,1,-1,-1)      /* tmrc directory */
108  #define TMRCA       MKID(TMRC_TYPE,0,-1,-1)
109  #define TMRCC       MKID(TMRC_TYPE,1,-1,-1)
110  #define IOPDIR      MKID(IOP_TYPE,-1,-1,-1)      /* iop directory */
111  #define IOPO        MKID(IOP_TYPE,0,-1,-1)
112  #define IOP1        MKID(IOP_TYPE,1,-1,-1)
113  #define IOP2        MKID(IOP_TYPE,2,-1,-1)
114  #define IOP3        MKID(IOP_TYPE,3,-1,-1)
115  #define ENVDIR      MKID(ENVIRON_TYPE,-1,-1,-1)  /* environ directory */
116  #define MSCDIR      MKID(MSC_TYPE,-1,-1,-1)      /* msc directory */
117  #define MSCO        MKID(MSC_TYPE,0,-1,-1)
118
119  #endif   _sys_fs_cts.h
```

What is claimed is:

1. A method of operating a computer system, the computer system including multiple units including at least one central processing unit (CPU), at least one memory unit, and at least one input/output (I/O) unit, comprising the steps of:

creating a filesystem within the computer system, the filesystem having a directory tree which has an entry for each of said multiple units;

removing at least one of said multiple units from said computer system while maintaining the filesystem within the computer system, and correspondingly deleting the filesystem entry for any removed unit; and adding at least one new unit to replace said at least one of said multiple units that was removed from said computer system while said computer system is continuing to operate, and adding at least one new entry to said filesystem, said at least one new entry corresponding to said at least one new unit.

2. A method according to claim 1 wherein there are three of said CPU units and two of said memory units.

3. A method according to claim 1 including the step of executing an instruction stream by said at least one CPU unit in accordance with a Unix operating system.

4. A method according to claim 3 wherein said filesystem includes a subdirectory for CPU units and an individual file for each of said at least one CPU units, and includes a subdirectory for memory units and an individual file for each one of said at least one memory unit.

5. A method of operating a computer system, comprising the steps of:
  executing a same instruction stream by a plurality of central processing (CPU) units;
  accessing by said CPU units a plurality of memory units each storing an identical copy of data, and a plurality of redundant input/output (I/O) units;
  creating a filesystem within the computer system, the filesystem having a directory tree with an entry for each of said CPU units, each of said memory units and each of said I/O units:
  removing at least one of said CPU units, or at least one of said memory units, or at least one of said I/O units from said system while maintaining the filesystem within the computer system, and correspondingly deleting the filesystem entry for any removed unit; and
  adding at least one new unit to replace said at least one of said CPU units, memory units, or I/O units that was removed from said system while said CPU units are continuing to execute said instruction stream, and adding at least one new entry to said filesystem, said at least one new entry corresponding to said at least one new unit.

6. A method according to claim 5 wherein there are three of said CPU units.

7. A method according to claim 5 wherein there are two of said memory units.

8. A method according to claim 5 wherein there are at least two of said I/O units.

9. A method according to claim 5 wherein said step of executing an instruction stream is in accordance with a Unix operating system.

10. A computer system comprising:
  a) first, second and third central processing unit (CPU) units each having an address range and each executing a same instruction stream, each of said CPU units having a separate memory access port, wherein a failed one of said first, second and third CPU units is placed off-line and a remaining two of said first, second and third CPU units continue to execute said same instruction stream;
  b) first and second memory units having identical address spaces within the address range of said CPU units for storing duplicative data to be accessed by said CPU units, each of said first and second memory units having first, second and third input/output ports coupled to said memory access ports of said first, second and third CPU units, respectively, wherein a failed one of said first and second memory units is placed off-line and a remaining one of said first and second memory units continues to be accessed by said CPU units; and
  c) a filesystem storing a directory having an entry for each one of said CPU units and memory units which is currently operating.

11. A computer system according to claim 10 wherein each one of said memory units has first, second and third ports to said CPU units, said ports including voting means to compare information between the ports for accesses and to allow accesses to be completed only where at least two of the ports have the same information for each of the memory units.

12. A computer system according to claim 10 including first and second input/output busses, and wherein said first and second memory means each has a separate peripheral I/O port, and said first and second input/output busses are separately coupled to said I/O ports of said first and second memory means.

13. A computer system according to claim 10 including means for synchronizing execution of the instruction stream in said CPU units by stalling execution of a memory reference until all three of said first, second and third CPU units are executing the exact same memory reference.

14. A computer system according to claim 10 wherein each one of said CPU units has a separate clock whereby said CPU units operate asynchronously.

15. A computer system according to claim 14 wherein each one of said first and second memory units has a separate clock, whereby said CPU units and memory units all operate asynchronously.

16. A computer system according to claim 15 wherein said CPU units are loosely synchronized with one another by stalling leading CPU units until the slower CPU units have caught up, upon occurrence of a memory reference.

17. A fault-tolerant computer system, comprising:
  a) first, second and third central processing unit (CPU) units having similar interfaces and capable of executing an identical instruction set, said first, second and third CPUs executing a same instruction stream, wherein a failed one of said first, second and third CPUs is placed off-line and a remaining two of said first, second and third CPUs continue to execute said same instruction stream;
  b) first and second memory units having similar interfaces, said first and second memory units storing a same data, wherein a failed one of said first and second memory units is placed off-line;
  c) busses coupling each of the first, second and third CPU units individually to each of said first and second memory units wherein said first, second and third CPU units access said first and second memory units via the busses separately and in duplicate;
  d) a first input/output bus coupled to said first memory unit and a second input/output bus coupled to said second memory unit;
  e) a first input/output processor coupled to both said first and second input/output busses, and a second input/output processor coupled to both said first and second input/output busses;
  f) a filesystem having a directory with corresponding entries for each of said CPU units, each of said memory units, and each of said input/output processors which is currently operating.

18. A system according to claim 17 wherein said CPU units are executing a Unix operating system when executing said instruction stream.

* * * * *